United States Patent
Oh et al.

(10) Patent No.: US 12,373,058 B2
(45) Date of Patent: Jul. 29, 2025

(54) FLEXIBLE-TYPE ELECTRONIC DEVICE AND OPERATING METHOD THEREFOR

(71) Applicant: SAMSUNG ELECTRONICS CO., LTD., Suwon-si (KR)

(72) Inventors: Deukkyu Oh, Suwon-si (KR); Kwangtaek Woo, Suwon-si (KR); Byoungkug Kim, Suwon-si (KR); Changho Lee, Suwon-si (KR); Jinwan An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/202,144

(22) Filed: May 25, 2023

(65) Prior Publication Data

US 2023/0315229 A1    Oct. 5, 2023

Related U.S. Application Data

(63) Continuation of application No. PCT/KR2021/016788, filed on Nov. 16, 2021.

(30) Foreign Application Priority Data

Nov. 30, 2020    (KR) .......................... 10-2020-0165059

(51) Int. Cl.
*G06F 3/04886*    (2022.01)
*G06F 1/16*    (2006.01)
*G06F 3/041*    (2006.01)

(52) U.S. Cl.
CPC ........ *G06F 3/04166* (2019.05); *G06F 1/1624* (2013.01); *G06F 1/1652* (2013.01);
(Continued)

(58) Field of Classification Search
CPC .. G06F 3/04166; G06F 1/1624; G06F 1/1652; G06F 3/0412; G06F 3/04886;
(Continued)

(56) References Cited

U.S. PATENT DOCUMENTS

| 8,502,788 B2 | 8/2013 | Cho |
| 10,606,374 B2 | 3/2020 | Park et al. |

(Continued)

FOREIGN PATENT DOCUMENTS

| KR | 10-2010-0052227 A | 5/2010 |
| KR | 10-2014-0044228 A | 4/2014 |

(Continued)

OTHER PUBLICATIONS

International Search Report (PCT/ISA/210) issued by the International Searching Authority on Mar. 8, 2022 in International Application No. PCT/KR2021/016788.

(Continued)

*Primary Examiner* — Jeff Piziali
(74) *Attorney, Agent, or Firm* — Sughrue Mion, PLLC

(57) ABSTRACT

An electronic device includes a memory, a touch panel, a display having a flexible structure, at least one sensor, and at least one processor, and the memory stores instructions that cause, when executed, the at least one processor to during a driving section in which a changing in the screen size of the display is detected by the at least one sensor, adjust a touch sensitivity of the touch panel from a first setting value to a second setting value, and to, based on determining that the changing of the screen size of the display is detected to be finished by a sensing result of the at least one sensor, adjust the touch sensitivity of the touch panel from the second setting value to the first setting value.

10 Claims, 18 Drawing Sheets

(52) U.S. Cl.
CPC ........ *G06F 3/0412* (2013.01); *G06F 3/04886* (2013.01); *G06F 2203/04102* (2013.01); *G06F 2203/04803* (2013.01)

(58) Field of Classification Search
CPC . G06F 2203/04102; G06F 2203/04803; G06F 1/1643; G06F 1/1677; G06F 1/1692; G06F 1/3215; G06F 1/3262; G06F 3/041661; G06F 2203/04806; G06F 3/04842; G06F 3/04845; G06F 3/0488; G06F 3/04883; G06F 3/0482; G06F 3/0418; G06F 3/0484
See application file for complete search history.

(56) References Cited

U.S. PATENT DOCUMENTS

| | | | |
|---|---|---|---|
| 10,678,428 | B2 | 6/2020 | Kim et al. |
| 10,908,738 | B2 | 2/2021 | Kim et al. |
| 11,252,826 | B2 | 2/2022 | Park et al. |
| 2008/0093130 | A1 | 4/2008 | Lee et al. |
| 2008/0291225 | A1* | 11/2008 | Arneson ............... G06F 3/147 345/698 |
| 2008/0305836 | A1* | 12/2008 | Kim .................. G06F 3/04886 345/173 |
| 2010/0117975 | A1* | 5/2010 | Cho ...................... G06F 1/1652 345/173 |
| 2010/0149130 | A1 | 6/2010 | Jung et al. |
| 2014/0101560 | A1 | 4/2014 | Kwak et al. |
| 2014/0267104 | A1* | 9/2014 | Ahmed ............. G06F 3/041661 345/173 |
| 2014/0267132 | A1* | 9/2014 | Rabii ................. G06F 3/04182 345/173 |
| 2014/0306908 | A1* | 10/2014 | Nagaraju ............. G06F 1/1652 345/173 |
| 2015/0286288 | A1 | 10/2015 | Lee et al. |
| 2015/0317006 | A1 | 11/2015 | Cho et al. |
| 2016/0062515 | A1* | 3/2016 | Bae .................... G06F 3/04186 345/174 |
| 2016/0179236 | A1* | 6/2016 | Shin .................... H04M 1/0216 345/173 |
| 2016/0306491 | A1* | 10/2016 | Lee ........................ G06F 3/0346 |
| 2016/0321969 | A1* | 11/2016 | Kambhatla ........... G06F 1/1641 |
| 2017/0300736 | A1* | 10/2017 | Song .................. G06V 40/1312 |
| 2018/0191892 | A1* | 7/2018 | Kim .................. H04M 1/72454 |
| 2019/0138179 | A1 | 5/2019 | Xia |
| 2020/0192547 | A1 | 6/2020 | Kim et al. |
| 2020/0264826 | A1* | 8/2020 | Kwon .................... G06F 3/0488 |
| 2022/0398012 | A1* | 12/2022 | Gray .................... G06F 3/0412 |
| 2023/0325067 | A1* | 10/2023 | Zhou .................. G06F 3/04883 715/769 |

FOREIGN PATENT DOCUMENTS

| | | |
|---|---|---|
| KR | 10-2014-0142884 A | 12/2014 |
| KR | 10-1521219 B1 | 5/2015 |
| KR | 10-2015-0116281 B1 | 10/2015 |
| KR | 10-1581275 B1 | 12/2015 |
| KR | 10-2016-0012779 A | 2/2016 |
| KR | 10-2019-0101184 B1 | 8/2019 |
| KR | 10-2020-0074553 A | 6/2020 |
| KR | 10-2020-0101306 A | 8/2020 |

OTHER PUBLICATIONS

Written Opinion (PCT/ISA/237) issued by the International Searching Authority on Mar. 8, 2022 in International Application No. PCT/KR2021/016788.
Communication dated Mar. 5, 2024, issued by the European Patent Office in European Application No. 21898472.2.
Communication dated Feb. 25, 2025 issued by the Korean Intellectual Property Office in Korean Patent Application No. 10-2020-0165059.

* cited by examiner

FLEXIBLE-TYPE ELECTRONIC DEVICE AND OPERATING METHOD THEREFOR

CROSS-REFERENCE TO RELATED APPLICATIONS

This application is by-pass continuation application of International Application No. PCT/KR2021/016788, filed on Nov. 16, 2021, which based on and claims priority to Korean Patent Application No. 10-2020-0165059, filed on Nov. 30, 2020, in the Korean Intellectual Property Office, the disclosures of which are incorporated by reference herein in their entireties.

BACKGROUND

1. Field

The disclosure relates to a flexible-type electronic device for controlling sensitivity of a touch screen and an operation method therefor.

2. Description of Related Art

As portable digital terminals are widely used and developed to have high performance as information processors, various methods of processing user input information are being proposed. These are methods making it easier for users to use phone book, short message composing, and electronic notebook functions implemented in portable digital terminals. One of the methods is an input method using a touch screen.

Due to the convenience of a user interface, a touch screen method is widely used to perform functions of phone book, scheduler, short messaging, personal information management, Internet access, electronic dictionary, and the like in personal digital assistants (PDAs), smartphones combined with mobile phones, Internet phones, and the like. In particular, the touch screen is recognized as the most ideal input method in a graphical user interface (GUI) environment because users are able to directly perform desired operations while viewing a screen and because the touch screen is able to be easily operated by anyone.

In line with the development of the electronic communication industry, a variety of portable terminals equipped with a touch screen are being introduced. Portable terminals are on a trend in which multiple functions, as well as a voice call function, are integrated into a single device.

In recent years, the use of electronic devices equipped with a flexible display structure capable of changing a physical shape of a screen area (hereinafter referred to as "flexible-type electronic devices") has proliferated. For example, foldable-type, rollable-type, or slidable-type smartphones may adopt a structure capable of expanding or reducing the screen area, thereby providing a wide screen by increasing the screen size as needed while maintaining excellent portability. In the case where the size of a window displayed in the screen area changes in the flexible-type electronic device, a layout that is configured to conform to a change in the size of the window is required.

The flexible-type electronic device may have various screen shapes depending on the state of using the same (e.g., roll-in/roll-out states or slide-in/slide-out states). Accordingly, layout configuration methods utilized in fixed-type screens may not be suitable to be applied to a variable-type screen of the flexible-type electronic device.

Therefore, when the size of a screen area varies in the flexible-type electronic device, a user interface (UI)/user experience (UX) different from that in the fixed screen area may be required. For example, while the electronic device having a fixed-type display focuses on how to display information on a fixed screen, the flexible-type electronic device focuses on how to reflect the characteristics of the expanded or reduced screen and how to effectively display information desired by the user on a variable screen.

In a flexible-type electronic device, if the sensitivity of a touch sensor mounted to a touch panel is set to a high level, a user touch for adjusting a screen size may cause an erroneous operation. For example, a touch input may be made against the user's intention during a sliding operation for adjusting the screen size in a flexible-type electronic device, thereby executing undesired operations. In order to prevent this, the flexible-type electronic device may disable the touch panel during the sliding operation, but this may cause a user touch not to be normally recognized due to the time required for switching between enable and disable states of the touch panel.

SUMMARY

Provided are a device for adjusting touch sensitivity in response to a change in the screen size in a flexible-type electronic device and an operation method thereof.

In addition, provided are an electronic device that operates such that a relatively lower touch sensitivity is applied while changing of a screen size is detected in a flexible display, compared to when the screen size is fixed, and an operation method thereof.

According to an aspect of the disclosure, an electronic device may include: a memory configured to store instructions: a touch panel: a display having a flexible structure: at least one sensor configured to sense a change in a screen size of the display; and at least one processor electrically connected to the memory, the touch panel, the display, and the at least one sensor, wherein the at least one processor is configured to execute the instructions to: during a driving section in which a changing in the screen size of the display is detected by the at least one sensor, adjust a touch sensitivity of the touch panel from a first setting value to a second setting value; and based on determining that the changing of the screen size of the display is detected to be finished by a sensing result of the at least one sensor, adjust the touch sensitivity of the touch panel from the second setting value to the first setting value.

The at least one processor is further configured to execute the instructions to recognize the driving section as a period from a first time, at which the at least one sensor detects that the screen size of the display starts to change, to a second time at which the at least one sensor detects that the screen size of the display is fixed.

The at least one processor is further configured to execute the instructions to recognize the driving section as a period from a first time, at which the at least one sensor detects that the screen size of the display starts to change, to a second time which is at a predetermined time after the at least one sensor detects that screen size of the display is fixed.

The touch sensitivity of the touch panel may be lower when adjusted to the second setting value than when adjusted to the first setting value.

The at least one processor is further configured to execute the instructions to, during the driving section: divide the display into a plurality of areas; and adjust the touch sensitivity of the touch panel differently in a first area of the plurality of areas than in a second area of the plurality of areas.

The at least one processor is further configured to execute the instructions to adjust the touch sensitivity to be lower in the first area and then the second area based on determining that, during the driving section, the first area is more likely to be touched that the second area.

The at least one processor is further configured to execute the instructions to further: determine that the changing of the screen size increases the screen size; and set the second setting value based on an amount of increase in the screen size.

The screen size of the display may be a size of a front window of the electronic device.

The memory may be further configured to store instructions that cause, when executed, the processor to: detect a touch operation to the touch panel during the changing of the screen size of the display; and perform, after the changing of the screen size of the display is finished, an operation according to the touch operation.

Based on a setting of the touch panel, the second setting value may indicate either a first sensitivity value or a second sensitivity value that is lower than the first sensitivity value, and the first setting values indicates a third sensitivity value that is both higher than the first sensitivity value and is also higher than the second sensitivity value.

According to an aspect of the disclosure, an operation method of a flexible-type electronic device may include: monitoring a change in a screen size of a flexible display: during a driving section in which the change in the screen size is detected, adjusting a touch sensitivity of a touch panel from a first setting value to a second setting value; based on determining that the change of the screen size is finished, adjusting the touch sensitivity of the touch panel from the second setting value to the first setting value; and recognizing a touch on the touch panel using the touch sensitivity at least at one of the first setting value and the second setting value.

The driving section may be recognized as a period from a first time, at which the screen size of the flexible display is determined to start to change, to a second time at which the screen size of the display is determined to be fixed.

The driving section may be recognized as a period from a first time, at which the screen size of the flexible display is determined to start to change, to a second time which is at a predetermined time after the screen size of the display is determined to be fixed.

The touch sensitivity of the touch panel may be lower when adjusted to the second setting value than when adjusted to the first setting value.

The operation method may further include, during the driving section: dividing the flexible display into a plurality of areas; and adjusting the touch sensitivity of the touch panel differently in a first area of the plurality of areas than in a second area of the plurality of areas.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments will be described in detail with reference to the accompanying drawings. In the following description, specific details such as detailed configurations and elements will be provided merely to facilitate a general understanding of the embodiments of the disclosure. Accordingly, it should be apparent to those skilled in the art that various changes and modifications of the embodiments described herein may be made without departing from the scope and spirit of the disclosure. In addition, descriptions of well-known functions and configurations may be omitted for clarity and conciseness.

Figure 1:
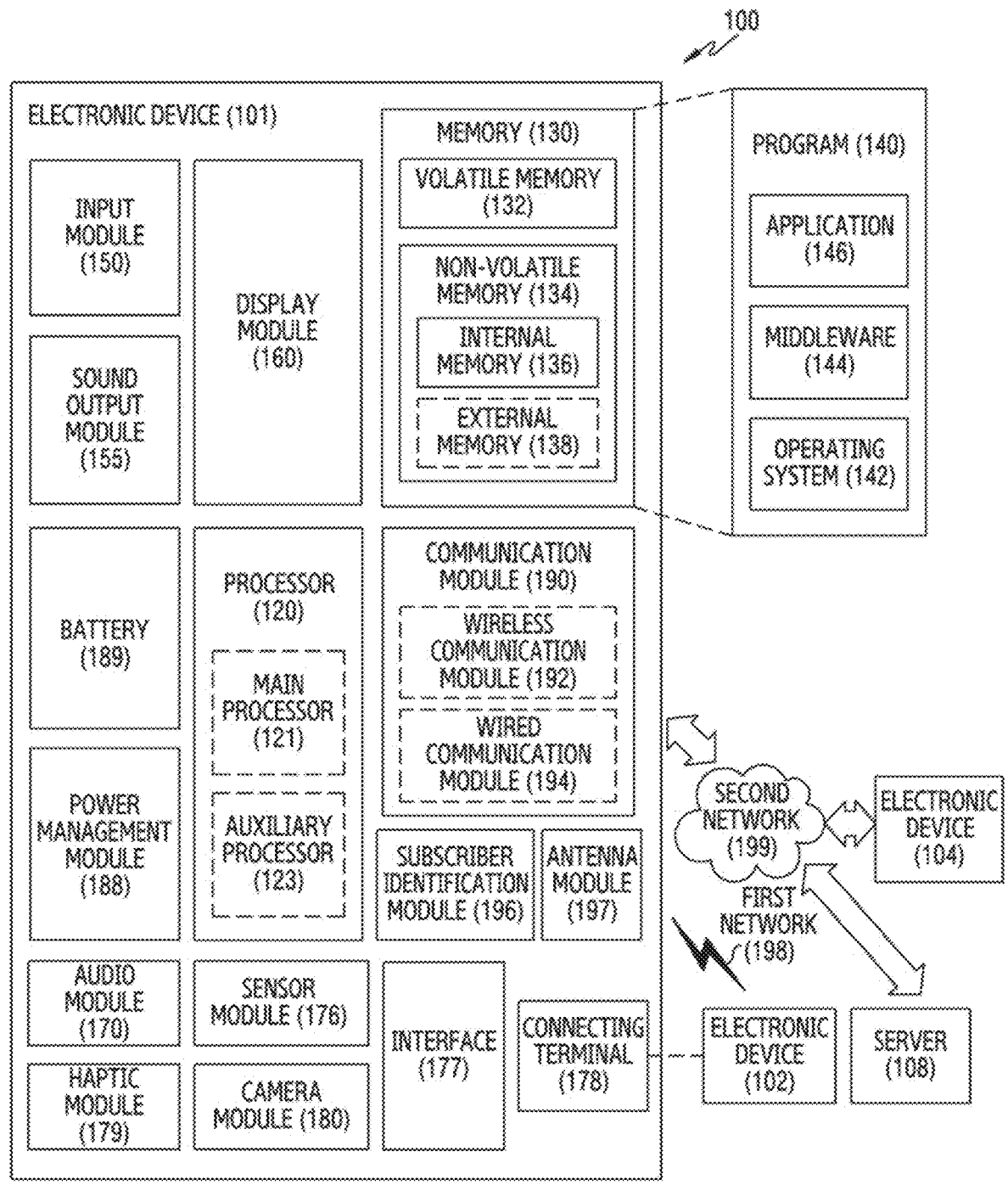
FIG. 1 is a diagram illustrating an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102, via a first network 198 (e.g., a short-range wireless communication network), or may communicate with an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic device 102 and the external electronic device 104 may be a device of a same type as, or a different type, from the electronic device 101. According to an embodiment, all or some of operations to be executed at the electronic device 101 may be executed at one or more of the external electronic device 102, the external electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
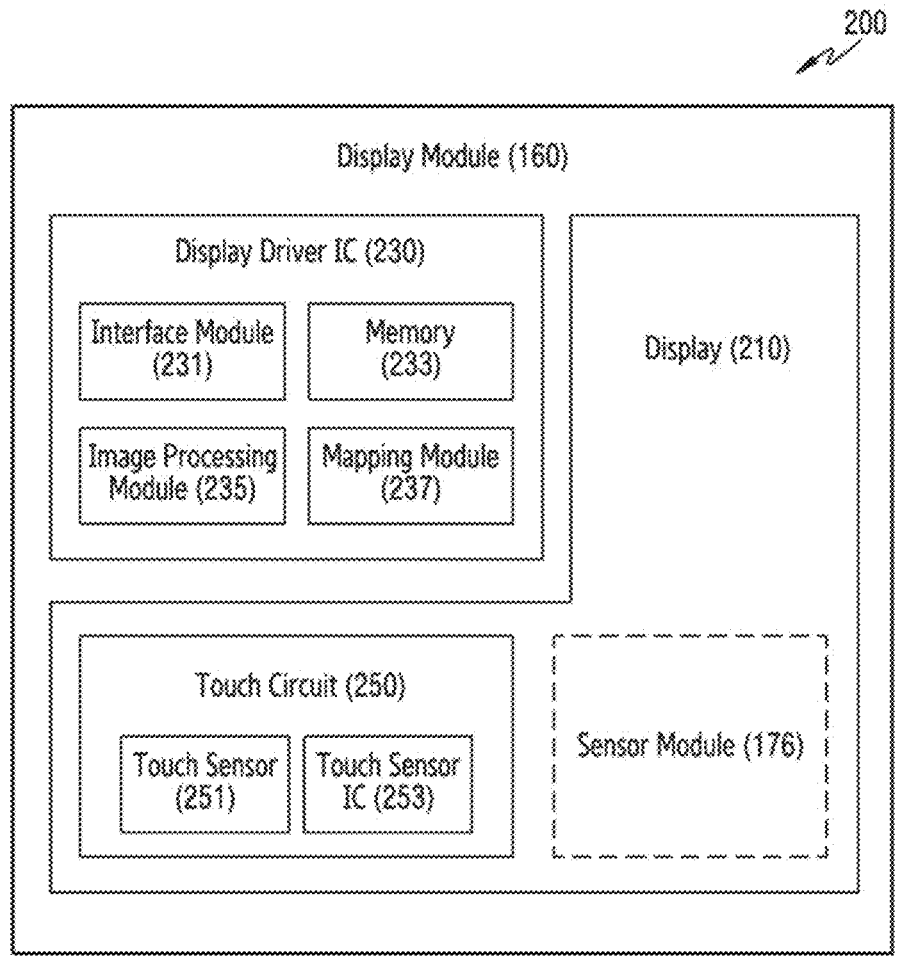
FIG. 2 is a diagram illustrating an electronic device supporting multiple frequency bands according to an embodiment.

FIG. 2 is a block diagram 200 of a display module 160 according to various embodiments.

Referring to FIG. 2, the display module 160 may include a display 210 and a display driver IC (DDI) 230 for controlling the same. The DDI 230 may include an interface module 231, a memory 233 (e.g., a buffer memory), an image processing module 235, or a mapping module 237. The DDI 230 may receive, for example, image data or image information including image control signals corresponding to commands for controlling the image data from another element of the electronic device 101 through the interface module 231. For example, according to an embodiment, the image information may be received from a processor 120 (e.g., the main processor 121 (e.g., an application processor) or the supplementary processor 123 (e.g., a graphic processing device) that operates independently of the functions of the main processor 121). The DDI 230 may communicate with a touch circuit 250 or a sensor module 176 through the interface module 231. In addition, the DDI 230 may store at least some of the received image information in the memory 233 in units of, for example, frames. The image processing module 235 may perform pre-processing or post-processing (e.g., adjusting resolution, brightness, or size) on at least some of the image data, based at least on the features of the image data or the features of the display 210. The mapping module 237 may produce a voltage value or current value corresponding to the image data pre-processed or post-processed by the image processing module 135. According to an embodiment, the production of the voltage value or current value may be performed at least partially based on attributes of pixels of the display 210 (e.g., arrangement of pixels (RGB stripe or pentile structure) or a size of each sub-pixel). At least some pixels of the display 210 may be driven at least partially based on the voltage value or current value, so that visual information (e.g., text, images, or icons) corresponding to the image data may be displayed on the display 210.

According to an embodiment, the display module 160 may further include a touch circuit 250. The touch circuit 250 may include a touch sensor 251 and a touch sensor IC 253 for controlling the same. The touch sensor IC 253 may control the touch sensor 251 to detect, for example, a touch input or hovering input to a specific position of the display 210. For example, the touch sensor IC 253 may measure a change in a signal (e.g., voltage, light amount, resistance, or charge amount) for a specific position of the display 210, thereby detecting a touch input or a hovering input. The touch sensor IC 253 may provide information (e.g., position, area, pressure, or time) about the detected touch input or hovering input to the processor 120. According to an embodiment, at least a part (e.g., the touch sensor IC 253) of the touch circuit 250 may be included as a part of the display driver IC 230 or the display 210, or may be included as a part of other elements (e.g., the supplementary processor 123) disposed outside the display module 160.

According to an embodiment, the display module 160 may further include at least one sensor (e.g., a fingerprint sensor, an iris sensor, a pressure sensor, or an illumination sensor) of the sensor module 176 or a control circuit therefor. In this case, the at least one sensor or the control circuit therefor may be embedded in a part (e.g., the display 210 or the DDI 230) of the display module 160 or in a part of the touch circuit 250. For example, in the case where the sensor module 176 embedded in the display module 160 includes a biometric sensor (e.g., a fingerprint sensor), the biometric sensor may obtain biometric information (e.g., fingerprint images) associated with a touch input through a partial area of the display 210. As another example, in the case where the sensor module 176 embedded in the display module 160 includes a pressure sensor, the pressure sensor may obtain pressure information associated with a touch input through a part or the entire area of the display 210. According to an embodiment, the touch sensor 251 or the sensor module 176 may be disposed between pixels of a pixel layer of the display 210 or above or below the pixel layer.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Figure 3:
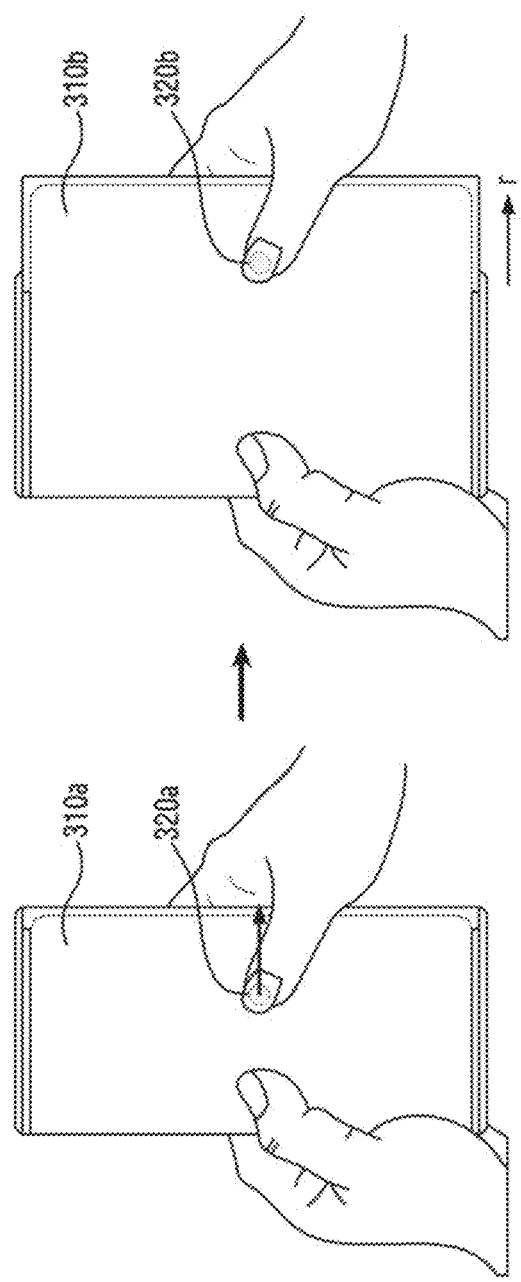
FIG. 3 is a diagram illustrating an example of an operation in which a screen size is increased in a flexible-type electronic device according to an embodiment.

FIG. 3 is a diagram illustrating an example of an operation in which a screen size is increased in an electronic device (e.g., the electronic device 101 in FIG. 1) according to an embodiment. The electronic device may provide, for example, a flexible display having a sliding structure.

Referring to FIG. 3, the screen size of the electronic device may be increased by a sliding-out operation (hereinafter referred to as an "expansion operation") and reduced by a sliding-in operation (hereinafter referred to as a "reduction operation"). The expansion operation may be, for example, a series of operations for switching from a sliding-in state (a) in which the screen 310a is small to a sliding-out state (b) in which the screen 310b is big. The reduction operation may be, for example, a series of operations for switching from a sliding-out state (b) in which the screen 310b is big to a sliding-in state (a) in which the screen 310a is small.

According to an embodiment, in the case of an electronic device in which the expansion operation (or reduction operation) is performed manually, a user may move the screen 310a or the screen 310b in a sliding-out direction (or sliding-in direction) in the state 320a or the state 320b of touching the screen. In this case, a user touch for attempting the expansion operation or the reduction operation may select some of the information related to the content displayed on the screen so that an operation due to the selected information may be performed. The selection may occur, for example, when a press is made by a touch at the time of starting the expansion operation or reduction operation and then the press is released upon completion of the expansion operation or reduction operation.

Therefore, it may be desirable for the electronic device to prevent an erroneous operation caused by a press and a press release according to a user touch while the screen size is changing (e.g., increasing or decreasing) due to an operation of adjusting the screen size (e.g., the expansion operation or the reduction operation).

Figure 4A:
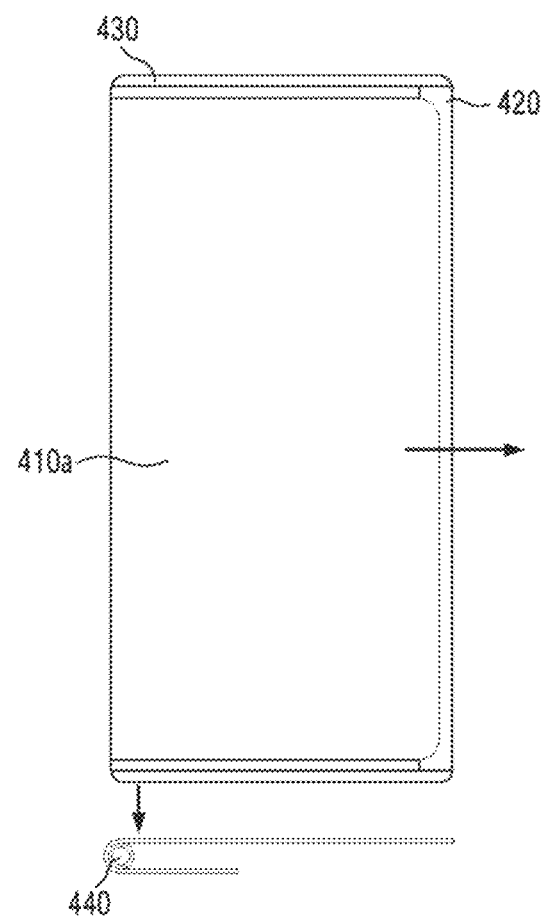
FIG. 4A is a diagram illustrating the structure of a flexible-type electronic device in a sliding-in state according to an embodiment.

FIG. 4A is a diagram illustrating the structure of an electronic device (e.g., the electronic device 101 in FIG. 1) in a sliding-in state according to an embodiment.

Referring to FIG. 4A, the electronic device may provide a flexible display having a sliding structure including a sliding housing 420, a main housing 430, and a sliding axis 440 for changing a screen size. The sliding axis 440 may also be a rolling axis. The electronic device may provide a screen size corresponding to a main area 410*a* in a sliding-in state. The main area 410*a* may be the smallest screen capable of being provided by the electronic device.

According to an embodiment, a structure in which the sliding housing 420 overlaps the main housing 430 may be provided in the sliding-in state. For example, in the sliding-in state, the sliding housing 420 may be positioned to cover the main housing 430 or to be inserted under the main housing 430. In the sliding-in state, a partial area of a slidable display, as the main area 410*a*, may be exposed to the outside, and the remaining area of the slidable display may be hidden so as not to be exposed to the outside. For example, the remaining area of the slidable display may be hidden behind the sliding axis 440 or may be rolled up around the rolling axis that may be provided instead of the sliding axis 440. The electronic device may have, for example, a structure in which the remaining area of the slidable display may enter the inside of the electronic device, based on the sliding axis 440, in the sliding-in state.

Figure 4B:
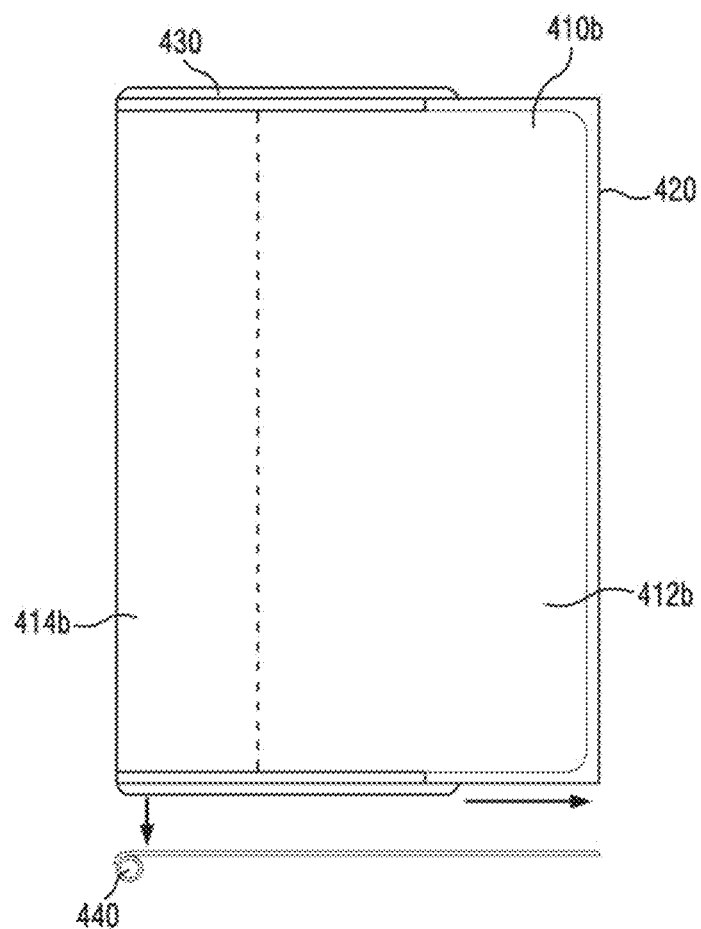
FIG. 4B is a diagram illustrating the structure of a flexible-type electronic device in a sliding-out state according to an embodiment.

FIG. 4B is a diagram illustrating the structure of an electronic device (e.g., the electronic device 101 in FIG. 1) in a sliding-out state according to an embodiment.

Referring to FIG. 4B, the electronic device may provide a flexible display having a sliding structure including a sliding housing 420, a main housing 430, and a sliding axis 440 for changing a screen size. The sliding axis 440 may also be a rolling axis. The full screen 410*b* of the electronic device may include, in a sliding-out state, a main area 412*b* and an alpha area 414*b*. The main area 412*b* is an area corresponding to a basic screen provided by the electronic device in the sliding-in state, and the alpha area 414*b* is an area corresponding to an expanded screen in the sliding-out state.

According to an embodiment, a structure in which the sliding housing 420 is separated from the main housing 430 may be provided in the sliding-out state. For example, in an expansion operation (e.g., a sliding-out operation) for switching from the sliding-in state to the sliding-out state, the sliding housing 420 may slide in a direction/along the main housing 430. When the sliding housing 420 slides in the direction/along the main housing 430, the flexible display rolled up around the sliding axis 440 may be unrolled, or the screen corresponding to the alpha area 414*b*, which is hidden in the back or inside the electronic device, may be expanded In the reduction operation (e.g., a sliding-in operation) for switching from the sliding-out state to the sliding-in state, the sliding housing 420 may slide in a direction opposite the direction/along the main housing 430. When the sliding housing 420 slides in a direction opposite the direction/along the main housing 430, a flexible display corresponding to a screen corresponding to the alpha area 414*b* may be inserted into the back or the inside, based on the sliding axis 440, or a flexible display corresponding to a screen corresponding to the alpha area 414*b* may be rolled up around a rolling axis in the case where the rolling axis replaces the sliding axis 440.

The aforementioned electronic device (e.g., the electronic device 101 in FIG. 1) may provide three operation states in an operation (e.g., an expansion operation or a reduction operation) of changing the screen size. The three operating states may include an initial state before a corresponding operation starts, a driving state in which a corresponding operation is in progress, and a completion state after a corresponding operation is finished. The driving state is not limited only to the state in which the screen size is continuously changed without interruption. For example, even if a certain delay occurs in the middle of changing the screen size, it may be determined as the driving state.

Figure 5:
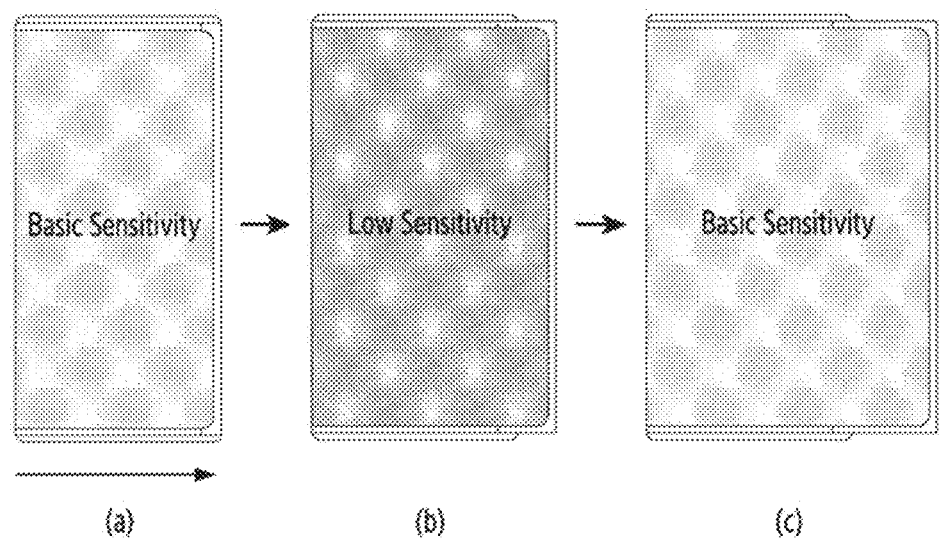
FIG. 5 is a diagram illustrating an example of adjusting touch sensitivity during an expansion operation in a flexible-type electronic device according to an embodiment.

FIG. 5 is a diagram illustrating an example of adjusting touch sensitivity during an expansion operation in an electronic device (e.g., the electronic device 101 in FIG. 1) according to an embodiment. It is assumed that a flexible display of the electronic device has a sliding structure in FIG. 5.

Referring to FIG. 5, the electronic device may adjust touch sensitivity during an expansion operation. For example, the electronic device may lower touch sensitivity even while the screen size is increased by an expansion operation such as a sliding-out operation.

According to an embodiment, the states according to the expansion operation may be classified into three types in the electronic device. The three states may include an initial state (a), a driving state (b), and a completion state (c). The electronic device may maintain or restore the touch sensitivity as or to a basic sensitivity (e.g., 5Phi) in the initial state (a) and the completion state (c) of the three states, and adjust the touch sensitivity to a low sensitivity (e.g., 3Phi or 4Phi) in the driving state (b) of the three states. The initial state (a) may be a state before an expansion operation starts, such as the sliding-in state, in the electronic device, and the driving state (b) may be a state in which an expansion operation for switching from the initial state (a) to the completion state (c) is in progress, and the completion state (c) may be a state immediately after the expansion operation is finished or a state in which a predetermined time elapses after the expansion operation is finished.

Table 1 below shows an example of touch sensitivity in three states.

TABLE 1

| Touch sensitivity | Setting values (Unit) |
|---|---|
| High sensitivity | 5 Phi |
| Basic sensitivity | 4 Phi |
| Low sensitivity | 3 Phi |

Although not shown in this document, the electronic device may adjust the touch sensitivity even during a reduction operation. For example, the electronic device may lower the touch sensitivity even while the screen size is reduced by a reduction operation such as a sliding-in operation.

According to an embodiment, the states according to the reduction operation may also be classified into three types in the electronic device. The three states may include an initial state (c), a driving state (b), and a completion state (a). The electronic device may adjust the touch sensitivity to a basic sensitivity (e.g., 5Phi) in the initial state (c) and the completion state (a) of the three states, and adjust the touch sensitivity to a lower sensitivity (e.g., 3Phi or 4Phi) in the driving state (b) of the three states.

According to the above proposal, the electronic device may adjust the touch sensitivity to be relatively low in the driving state where the screen size is changing, compared to the initial state and the completion state, thereby preventing erroneous operations due to a touch during the expansion or reduction operation. In addition, even if the touch sensitivity is lowered while the screen size is changing, when an event in which a user touch satisfies specific conditions is recognized, the electronic device may perform a seamless operation (e.g., UI/UX) in response to the event in the completion state in which the screen size does not change.

Figure 6:
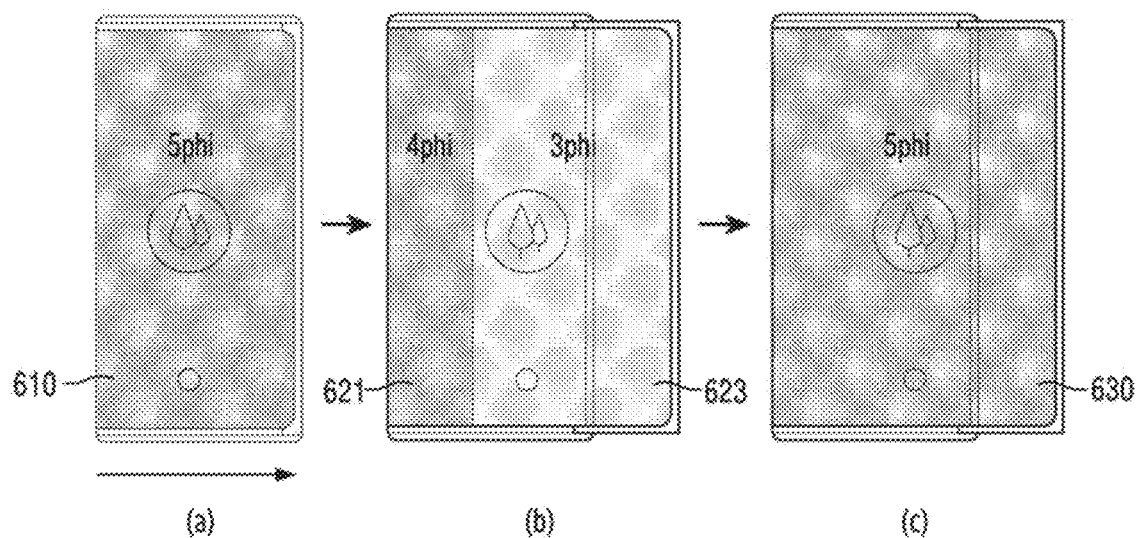
FIG. 6 is a diagram illustrating a specific example of adjusting touch sensitivity during an expansion operation in a flexible-type electronic device according to an embodiment.

FIG. 6 is a diagram illustrating a specific example of adjusting touch sensitivity during an expansion operation in an electronic device (e.g., the electronic device 101 in FIG. 1) according to an embodiment. It is assumed that a flexible display of the electronic device has a sliding structure in FIG. 6.

Referring to FIG. 6, the electronic device may proceed to "the initial state (a)"→ "the driving state (b)"→ "the completion state (c)" during an expansion operation. Screen sizes may be different from each other in the initial state (a), the driving state (b), and the completion state (c). That is, the size of a screen 610 may be the smallest in the initial state (a), the size of a screen 630 may be the largest in the completion state (c), and the size of screens 621 and 623 in the driving state (b) may be determined between the size of the screen 610 in the initial state (a) and the size of the screen 630 in the completion state (c).

According to an embodiment, the initial state (a) may be a state before an expansion operation starts, such as a sliding-in state, in an electronic device. The screen 610 in the initial state (a) may have a minimum size capable of being provided by the flexible display. However, the initial state (a) is not limited to a state in which it has a minimum screen size. For example, the initial state (a) may be a state before a second expansion operation is performed after a delay of a predetermined time or more after the screen size is primarily increased by a first expansion operation. As another example, the initial state (a) may be a state before an expansion operation is performed after a delay of a predetermined time or more after the screen size is reduced to some extent but not to the minimum screen size by a reduction operation in the sliding-out state. That is, the initial state (a) may be a state in which the screen size is a minimum or a state in which a predetermined time or more elapses after at least one change in the screen size is made by the expansion operation or the reduction operation. In the initial state (a), the electronic device may maintain the touch sensitivity of a touch panel at a basic sensitivity (e.g., 5Phi) until recognizing that the expansion operation starts.

According to an embodiment, the driving state (b) may be a state in which an expansion operation switching from the initial state (a) to the completion state (c) is in progress. The screen in the driving state (b) may have a size obtained by adding a screen 621 reflecting the degree of movement of the flexible display to the screen 623 in the initial state (a). In the driving state (b), the electronic device may adjust the touch sensitivity of the touch panel to a sensitivity lower than the basic sensitivity, that is, a low sensitivity (e.g., 3Phi or 4Phi), after recognizing that the expansion operation starts until the expansion operation is finished in the completion state (c). For example, upon recognizing that the expansion operation starts, the electronic device may adjust the touch sensitivity to be different between a first screen area 623 and a second screen area 621 included in the full screen according to the expansion operation. The first screen area 623 may be a screen area in the initial state (a), which is included in the full screen according to the expansion operation. The second screen area 621 may become an alpha area increased by the expansion operation, which is included in the full screen according to the expansion operation. For example, the electronic device may lower touch sensitivity of the first screen area 623 to 3Phi and lower touch sensitivity of the second screen area 621 to 4Phi.

According to an embodiment, the completion state (c) may be a state immediately after the expansion operation is finished or a state in which a predetermined time elapses after the expansion operation is finished. The screen 630 in the completion state (c) may have a maximum screen size capable of being provided by the flexible display. In the completion state (c), the electronic device may restore the touch sensitivity of the touch panel to the basic sensitivity (e.g., 5Phi) immediately after the expansion operation is finished or after a predetermined time elapses since the expansion operation is finished.

Although not shown in this document, the electronic device may adjust the touch sensitivity even during the reduction operation. For example, the electronic device may lower the touch sensitivity even while the screen size is reduced by the reduction operation such as a sliding-in operation. In this case, the states according to the reduction operation in the electronic device may also be classified into three types. The three states may include an initial state before the reduction operation starts, such as the sliding-out state, a driving state in which the reduction operation of switching from the sliding-out state to the sliding-in state is in progress, and a completion state in which the reduction operation is finished, such as the sliding-in state. The initial state may be a state in which the flexible display has a maximum screen size provided. The initial state is not limited to the state of having the maximum screen size. For example, the initial state may be a state before a second reduction operation is performed after the screen size is primarily reduced by a first reduction operation. As another example, the initial state may be a state before the reduction operation is performed after the screen size is increased to some extent but not to the maximum screen size by the expansion operation in the sliding-in state.

Figure 7:
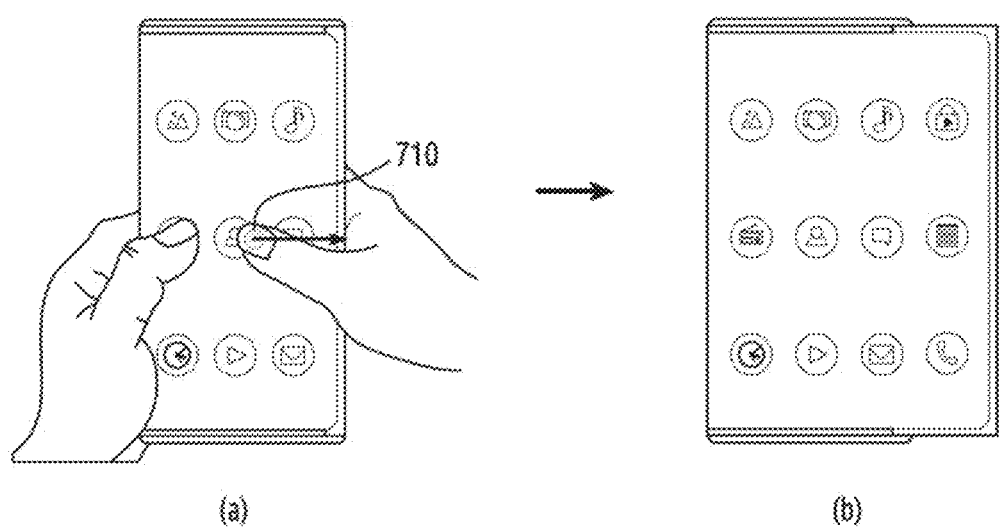
FIG. 7 is a diagram illustrating an example of displaying a screen by an expansion operation in a flexible electronic device according to an embodiment.

FIG. 7 is a diagram illustrating an example of displaying a screen by an expansion operation in an electronic device (e.g., the electronic device 101 in FIG. 1) according to an embodiment. It is assumed that a flexible display of the electronic device has a sliding structure in FIG. 7.

Referring to FIG. 7, an application icon may be selected by a user touch 710 in an initial state before an expansion operation in (a). The user may perform an expansion operation to increase the screen while holding the touch. At this time, assuming that the screen is in a home screen state or in an application list state in which icons are listed, an application may be unintentionally executed due to the user touch when the touch is released. To prevent this, the electronic device may adjust touch sensitivity of a touch panel to be low in the driving state in which the expansion operation is performed. Due to the lowered touch sensitivity, the electronic device may not recognize the user touch as occurrence of an event for requesting execution of an application corresponding to an icon selected by the touch. Therefore, as shown in (b), the electronic device may not perform an operation due to the user touch and may rearrange and display the icons, which were displayed before expansion, on the screen expanded by the expansion operation. The electronic device may restore the touch sensitivity to the original touch sensitivity after a delay of a predetermined time after the sliding-out operation is completed.

According to an embodiment, the electronic device may lower the touch sensitivity of a display area that is expanded by the sliding-out operation and adjust the time for recovering the touch sensitivity after the sliding-out operation is completed, causing a touch release to not be recognized so that a corresponding touch event is to be ignored. Such an operation of the electronic device may prevent unintentional erroneous operations due to a touch during the expansion operation.

Figure 8:
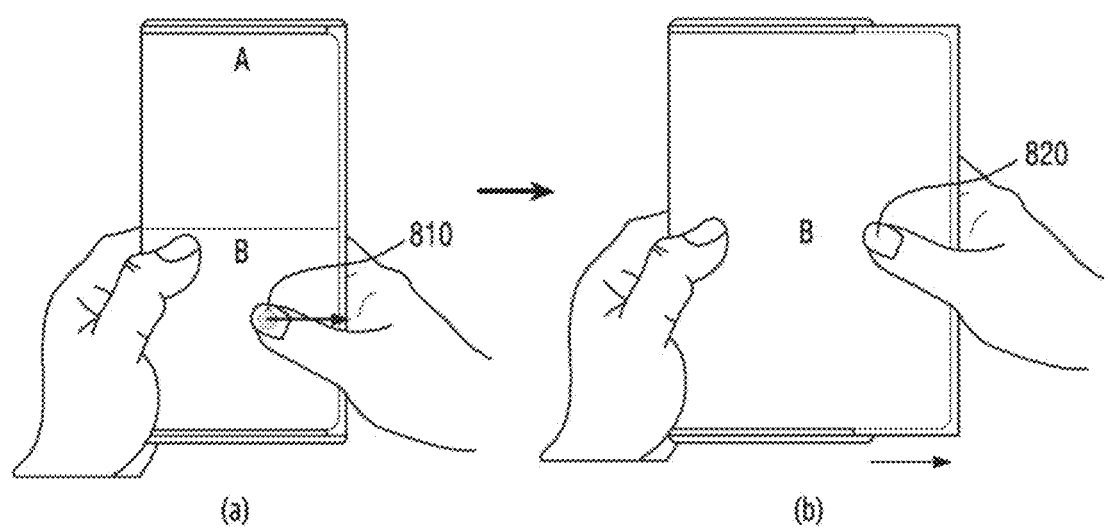
FIG. 8 is a diagram illustrating another example of displaying a screen by an expansion operation in a flexible electronic device according to an embodiment.

FIG. 8 is a diagram illustrating another example of displaying a screen by an expansion operation in an electronic device (e.g., the electronic device 101 in FIG. 1) according to an embodiment. It is assumed that a flexible display of the electronic device has a sliding structure in FIG. 8.

Referring to FIG. 8, the electronic device may lower touch sensitivity in a driving state in which the screen size is increased by an expansion operation and recognize that an event has occurred only when a user touch satisfies predetermined conditions. The predetermined conditions may be, for example, whether or not the user touch has a pressure higher than a threshold level at the lowered touch sensitivity. As another example, the predetermined conditions may be restoring the touch sensitivity lowered in the driving state as soon as the expansion operation is completed and determining whether or not the user touch is held even after the touch sensitivity is restored.

According to an embodiment, the electronic device may provide a multi-window using screens according to execution of two applications in the sliding-in state (a). The multi-window may include, for example, a screen A and a screen B. The screen A may be a screen resulting from execution of an application A, and the screen B may be a screen resulting from execution of an application B. For example, the user may perform a sliding-out operation while holding the touch 810 on the area of the screen B. Upon switching from the sliding-in state (a) to the sliding-out state (b) according to the sliding-out operation, the electronic device may expand and display the screen B resulting from the execution of the application B on the full screen in the sliding-out state (b). A condition in which a user touch 820 is to be held until the sliding-out operation is completed may be required to display the screen B on the full extended screen.

As an example, the electronic device may implement a scenario capable of enlarging a photo through the sliding-out operation and adjustment of touch sensitivity. For example, if at least one application is executed to display at least two scenes A and B on the screen in the initial state (a), and if the user touches (810) one scene B and performs a sliding-out operation while holding the touch, the electronic device may adjust touch sensitivity to enable touch recognition in the driving state.

According to an embodiment, the electronic device may restore the adjusted touch sensitivity to an original touch sensitivity immediately after the sliding-out operation is completed, thereby recognizing a user touch 820 before the user touch is released. Referring to (b) in FIG. 8, the electronic device may recognize a touch event by the recognized touch 820 and display the scene B, displayed on the touch area in the initial state, on the full screen.

According to another embodiment, the electronic device may lower touch sensitivity during the sliding-out operation and detect that a touch with a pressure higher than a threshold level occurs despite the lowered touch sensitivity. In this case, when the sliding-out operation is completed, the electronic device may perform an additional operation corresponding to the detected touch.

According to another embodiment, if the electronic device detects that a touch with a pressure higher than a threshold level occurs despite the lowered touch sensitivity due to the sliding-out operation, the electronic device may restore the touch sensitivity to its original state as soon as the sliding-out operation is completed. In this case, the electronic device may easily recognize a user touch according to restoration of the touch sensitivity.

Figure 9:
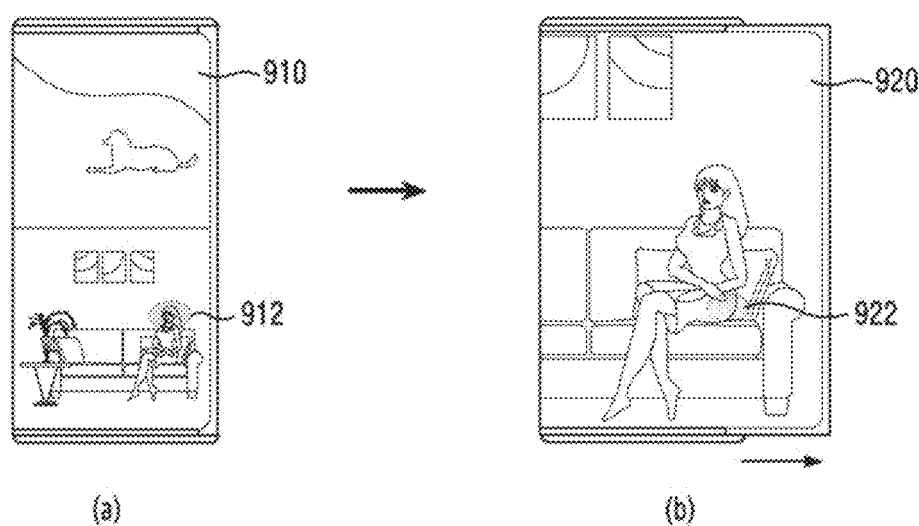
FIG. 9 is a diagram illustrating an implementation example of displaying a screen by an expansion operation in a flexible-type electronic device according to an embodiment.

FIG. 9 is a diagram illustrating an implementation example of displaying a screen by an expansion operation in an electronic device (e.g., the electronic device 101 in FIG. 1) according to an embodiment. It is assumed that a flexible display of the electronic device has a sliding structure in FIG. 9.

Referring to FIG. 9, in an initial state (a) in which two photos are displayed on a single screen 910 according to execution of an application for viewing photos, the electronic device may receive a touch input to an area 912 where the lower one of the two photos is displayed. Referring to (b) in FIG. 9, if a touch operation and a sliding-out operation are performed on the area 912 where the lower one of the two photos is displayed, the electronic device may adjust touch sensitivity to enable recognition of a touch during the sliding operation, restore the touch sensitivity as soon as the sliding operation is completed, recognize a touch event according to a held touch 922, and display the photo of the user touch area 912 in the initial state on the full screen.

Since the operation of the electronic device proposed above may perform a scenario supported by a user experience (UX) associated with a sliding operation, it is possible to improve device utilization by adjusting touch sensitivity.

Figure 10:
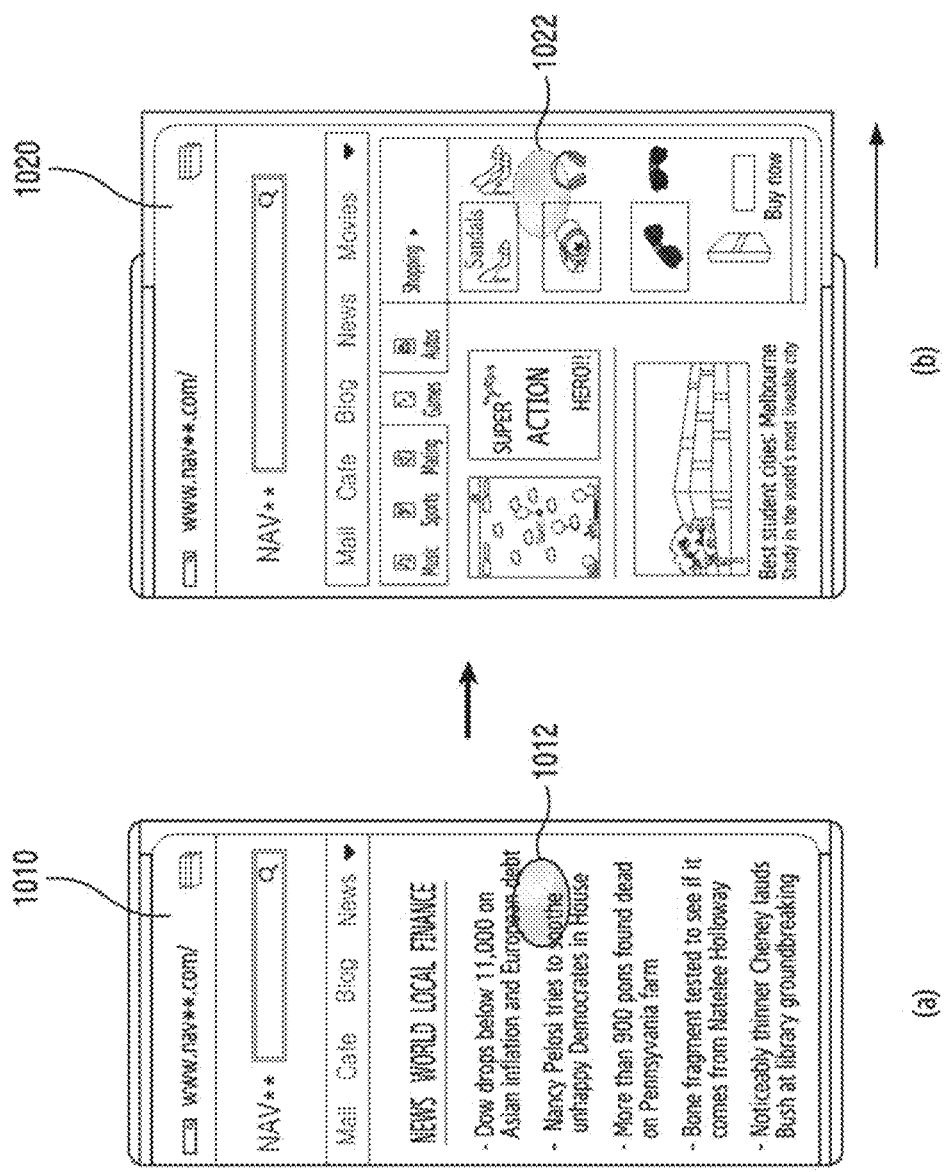
FIG. 10 is a diagram illustrating another implementation example of displaying a screen by an expansion operation in a flexible-type electronic device according to an embodiment.

FIG. 10 is a diagram illustrating another implementation example of displaying a screen by an expansion operation in an electronic device (e.g., the electronic device 101 in FIG. 1) according to an embodiment. It is assumed that a flexible display of the electronic device has a sliding structure in FIG. 10.

Referring to FIG. 10, a user touch 1012 may be recognized on a screen 1010 in an initial state (a) in which a web page according to execution of an application is displayed in a mobile version. Referring to (b) in FIG. 10, if a user touch 1012 is recognized on the screen 1010 and if a sliding-out operation is performed, the electronic device may adjust touch sensitivity without blocking touch recognition to enable touch recognition even during the sliding operation. The electronic device may restore the touch sensitivity as soon as the sliding operation is completed and, if holding of the user touch 1022 is recognized, display a web page in a PC version on the full screen of one screen 1020, thereby implementing a UX scenario.

Since the operation of the electronic device proposed above may perform a scenario supported by a user experience (UX) associated with a sliding operation, it is possible to improve device utilization by adjusting touch sensitivity.

Figure 11:
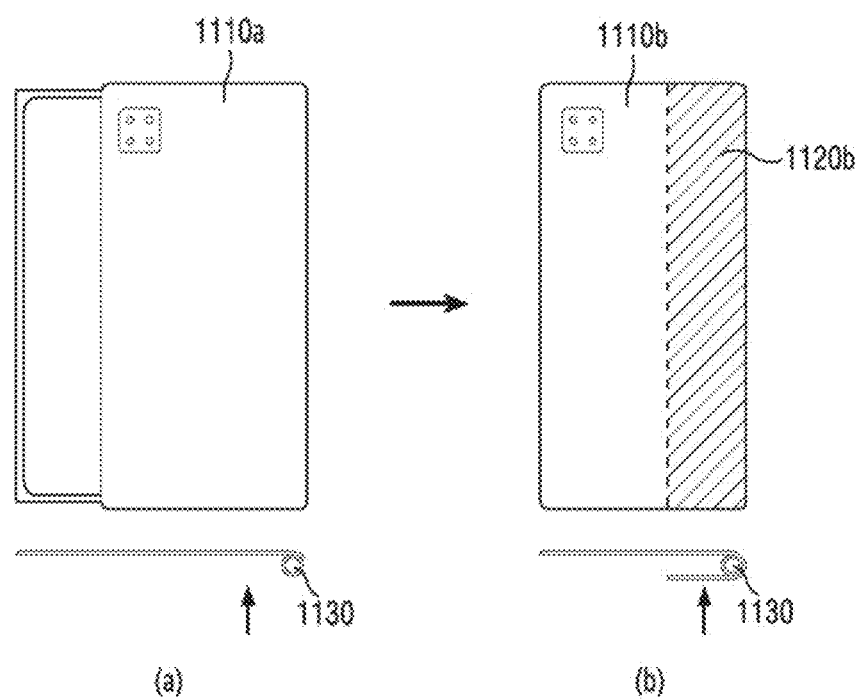
FIG. 11 is a diagram illustrating another implementation example of displaying a screen by an expansion operation in a flexible-type electronic device according to an embodiment.

FIG. 11 is a diagram illustrating another implementation example of displaying a screen by a reduction operation in an electronic device (e.g., the electronic device 101 in FIG. 1) according to an embodiment. It is assumed that a flexible display of the electronic device has a double-sided sliding structure in FIG. 11.

Referring to FIG. 11, if an un-sliding operation is detected, the electronic device may adjust touch sensitivity to a low sensitivity (3Phi) during the un-sliding operation. The un-sliding operation may correspond to an operation performed on the rear surface of the electronic device by a sliding-in operation. In the case where the electronic device has a double-sided touch sliding structure, there is no area for recognizing a user touch on the rear surface 1110a in the sliding-out state (a), but there may be an area 1120b for recognizing a user touch the rear surface 1110b in the sliding-in state (b). The touch area 1120b on the rear surface 1110b may correspond to rear glass exposed when a portion of the display having a touch panel moves into the electronic device due to the un-sliding operation.

According to an embodiment, while the un-sliding operation is performed, the electronic device may lower the touch sensitivity of the touch area 1120b exposed through the rear surface due to the un-sliding operation, thereby preventing an erroneous operation due to a user touch. The electronic device may lower the touch sensitivity of the touch area 1120b even while the touch area 1120b is being reduced due to the sliding operation.

As described above, when the touch sensitivity of the touch area 1120b disposed on the rear surface is adjusted to a low sensitivity, the electronic device may not recognize a general user touch. When the screen size stops changing, the electronic device may adjust the touch sensitivity to a basic sensitivity (4Phi), thereby continuously recognizing a general touch input. The above operation of the electronic device enables dynamical adjustment of the touch sensitivity until the un-sliding operation stops, even if a touch, which may inevitably cause erroneous operations, occurs on the back surface in the un-sliding state, thereby preventing erroneous operations caused by the touch on the rear surface.

According to an embodiment, the touch sensitivity may be adjusted depending on the amount of change in the sliding area in order to perform a quick touch input after the sliding-in and/or -out operation is stopped. In the following Equation 1 and Equation 2, a driving time according to switching between the disable state and the enable state of a touch integrated circuit (touch IC) is compared with a driving time according to the adjustment of touch sensitivity.

Equation 1

1 Touch IC Disable↔Enable: 200~250 ms        Eq. 1

Equation 2

1 Adjust Sensitivity: 5~20 ms        Eq. 2

According to Equation 1 and Equation 2, it may be seen that the operation time for adjusting the touch sensitivity is shorter than the operation time for switching the touch integrated circuit from a disable state to an enable state.

Referring to Table 2 below, in the operation time for adjusting the touch sensitivity, it is possible to quickly adjust the touch sensitivity only by transmitting a touch sensitivity setting value (Step 2).

wireless communication unit 1240, a motor 1250, a sensor unit 1260, or a storage 1270. The storage 1270 may include an operating system 1271, a user interface 1273, and an application program 1275. In various embodiments, the electronic device may include additional elements in addition to those shown in FIG. 12 or may omit at least one of the elements shown in FIG. 12.

According to an embodiment, the wireless communication unit 1240 may provide an interface for communication with other systems or devices. The wireless communication unit 1240 may include a network interface card or a wireless transmission/reception unit enabling communication through an external network (e.g., networks). The wireless communication unit 1210 may perform signal processing for access to a wireless network. The wireless network may include, for example, at least one of a wireless LAN and a cellular network (e.g., long-term evolution (LTE)).

According to an embodiment, the input unit 1230 may detect an input from the outside (e.g., a user) and provide data corresponding to the detected input to the controller 1210. The input unit 1230 may include at least one hardware module for detecting input from the outside. The at least one hardware module may include, for example, at least one of a sensor, a keyboard, a key pad, a touch pad, and a touch panel. In the case where the input unit 1230 is implemented as a touch panel, the input unit 1230 may be combined with the display 1220 to provide a touch screen. In this case, the input unit 1230 may provide data on user touch inputs (e.g., tap, press, pinch, stretch, slide, swipe, rotate, etc.) to the controller 1210.

According to an embodiment, the display 1220 may perform functions for outputting information in the form of numbers, text, images, graphics, and the like. The display 1220 may include at least one hardware module for output. The at least one hardware module may include, for example, at least one of a liquid crystal display (LCD), a light-emitting diode (LED), a light-emitting polymer display (LPD), an organic light emitting diode (OLED), an active matrix organic light-emitting diode (AMOLED), and a flex-

---

```
Step1: Init step FW configuration (boot up)
    //KERNEL/MAIN/Combination/SDM845_P/msm-
4.9/drivers/input/touchscreen/sec_ts/sec_ts.h
        1define SEC_TS_DEFAULT_SPU_FW    "/spu/TSP/ffu_tsp.bin"
        //KERNEL/MAIN/Combination/MSM8996_P/msm-
        3.18/drivers/input/touchscreen/sec_ts/sec_ts_fw.c
        static int sec_ts_load_fw_from_ums(struct sec_ts_data *ts, const char *file_path)
Step2: When touch sensitivity needs to be adjusted during folding sec_cmd_store fun call
        //KERNEL/MAIN/Combination/SDM6xx_P/msm-4.4/drivers/input/sec_cmd.c
        static ssize_t sec_cmd_store(struct device *dev, struct device_attribute *devattr,
                    const char *buf, size_t count)
        {
        .........
            if (kfifo_avail(&data->cmd_queue) && (queue_size <
        SEC_CMD_MAX_QUEUE)) {
                kfifo_in(&data->cmd_queue, &cmd, sizeof(struct command));
                pr_info("%s %s: push cmd: %s\n", SECLOG, __func__, cmd.cmd);
            } else {
        ............
            }
<6>[   57.011689]  [0:SSRM Handler Th: 6731] [sec_input] sec_cmd_store: push cmd:
glove_mode,1
```

---

Figure 12:
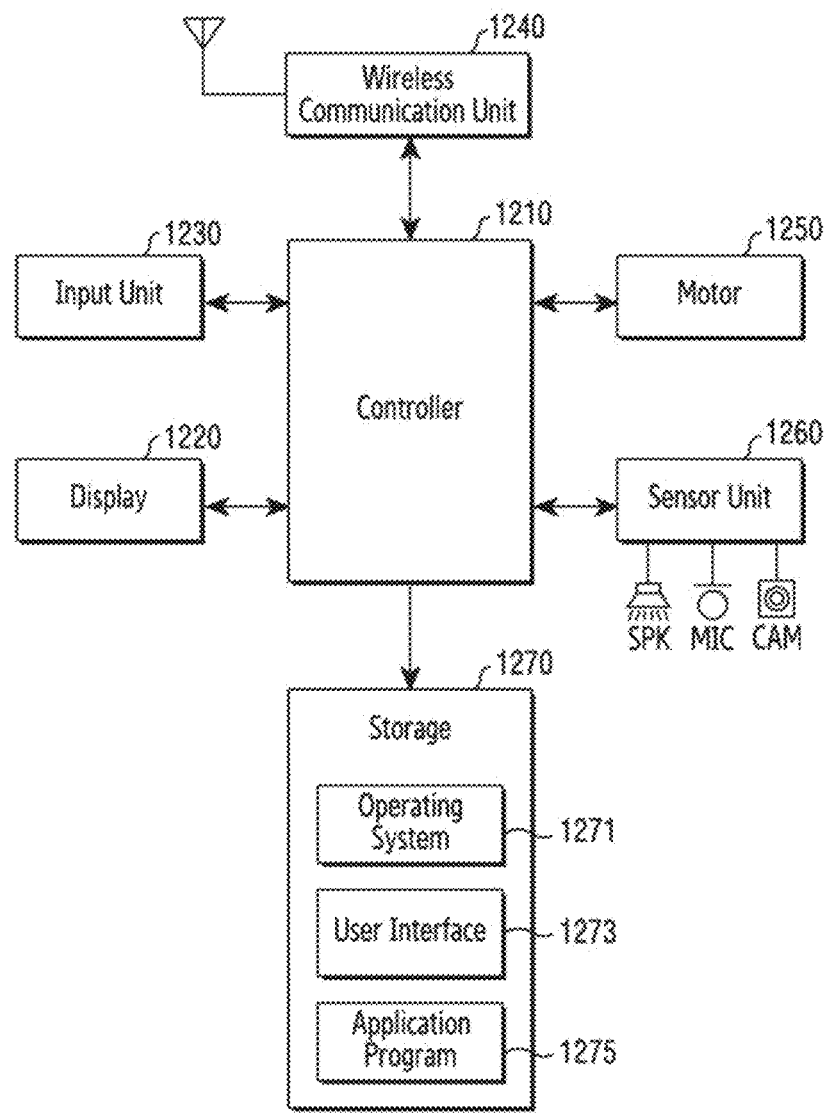
FIG. 12 is a diagram illustrating a block configuration for adjusting touch sensitivity in consideration of a change in the screen size of a flexible-type electronic device according to an embodiment.

FIG. 12 is a diagram illustrating a block configuration for adjusting touch sensitivity in consideration of a change in the screen size of an electronic device (e.g., the electronic device 101 in FIG. 1) according to an embodiment.

Referring to FIG. 12, the electronic device may include a controller 1210, a display 1220, an input unit 1230, a ible LED (FLED). The display 1220 may display a screen corresponding to data received from the controller 1210. The display 1220 may be referred to as an "output unit", a "display unit", or other terms equivalent thereto.

According to an embodiment, the storage 1270 may store basic programs for the operation of an electronic device, a user interface 1273, an application program 1275, or data such as configuration information. The storage 1270 may include a volatile memory, a non-volatile memory, or a combination of volatile and non-volatile memories. The storage 1270 may provide stored data according to a request of the controller 1210. The storage 1270 may store an operating system (OS) program 1271 and at least one application.

In an embodiment, the motor 1250 may be electrically connected to the rolling axis and the controller 1210. The motor 1250 may rotate the rolling axis using the voltage applied by the control of the controller 1210. The motor 1250 may determine the degree of rotation of the rolling axis, based on sliding state information of the display 1220 obtained from the controller 1210. The rotation of the rolling axis by the motor 1250 may move the flexible display to change (e.g., expand or reduce) the screen size.

According to an embodiment, the sensor unit 1260 may include at least one sensor. The sensor unit 1260 may have an electrical/operative relationship with a speaker, a microphone, and a camera. The sensor unit 1260 may provide a sensing result obtained through at least one sensor to the controller 1210. The sensing result obtained through the at least one sensor may include information such as whether or not the screen size of the flexible display has been changed and the changed screen size.

According to an embodiment, the controller 1210 may execute computation related to control and/or communication of at least one other element of the electronic device or data processing using instructions stored in the storage 1270. The controller 1210 may include at least one of a central processing unit (CPU), a graphic processing unit (GPU), a micro-controller unit (MCU), a sensor hub, a supplementary processor, a communication processor, an application processor, an application specific integrated circuit (ASIC), a field programmable gate array (FPGA), and may have a plurality of cores.

According to an embodiment, the controller 1210 may process data obtained from the input unit 1230 and the sensor 1260 or control operation states of the input unit 1230 and the sensor 1260. The controller 1210 may transmit and/or receive signals through the wireless communication unit 1240. The controller 1210 may display various screens through the display 1220.

According to an embodiment, the controller 1210 may receive a sensing result from at least one sensor included in the sensor unit 1260 and detect a driving section from the start time of changing the screen size of the display 1220 to the end time thereof by the sensing result. The controller 1210 may dynamically reduce a first setting value corresponding to an initial value during the detected driving section to determine a second setting value. The controller 1210 may adjust the touch sensitivity of a touch panel according to the determined second setting value. The controller 1210 may configure the touch sensitivity by the second setting value in the driving section to be lower than the touch sensitivity by the first setting value according to the initialization. The controller 1210 may divide the full screen, which is dynamically expanded during the driving section in which the screen size changes, into a plurality of areas and configure different second setting values for the plurality of areas according to the division. If it is detected that the changing of the screen size of the flexible display is finished according to the sensing result of at least one sensor, the controller 1210 may initialize the second setting value to the first setting value and adjust the touch sensitivity of the touch panel by the first setting value according to the initialization. For example, the controller 1210 determine a lower second setting value for an area that is likely to be touched by the user of the electronic device when the screen size of the display changes, among the plurality of areas obtained by dividing the full screen, than for an area that is not likely to be touched.

According to an embodiment, the controller 1210 may recognize, as a driving section in which the screen size changes, the period from a first time of detecting that the screen size of the display starts to decrease or that the screen size of the display starts to increase to a second time of detecting that the screen size of the display is fixed by the sensing result of at least one sensor.

According to an embodiment, the controller 1210 may recognize, as a driving section in which the screen size changes, the period from a first time of detecting that the screen size of the display starts to decrease or that the screen size of the display starts to increase to a second time after a predetermined time elapses since the screen size of the display is fixed by the sensing result of at least one sensor.

According to an embodiment, the controller 1210 may perform control to perform an operation according to a user experience scenario in response to a touch event after changing of the screen size is finished. For example, the controller 1210 may monitor if a touch event is detected in the time period corresponding to the driving section from adjustment of the touch sensitivity of the touch panel by the second setting value until detection of an end of changing the screen size of the display. If a touch event is detected, the controller 1210 may perform an operation corresponding to the detected touch event after the changing of the screen size of the display is finished.

Figure 13:
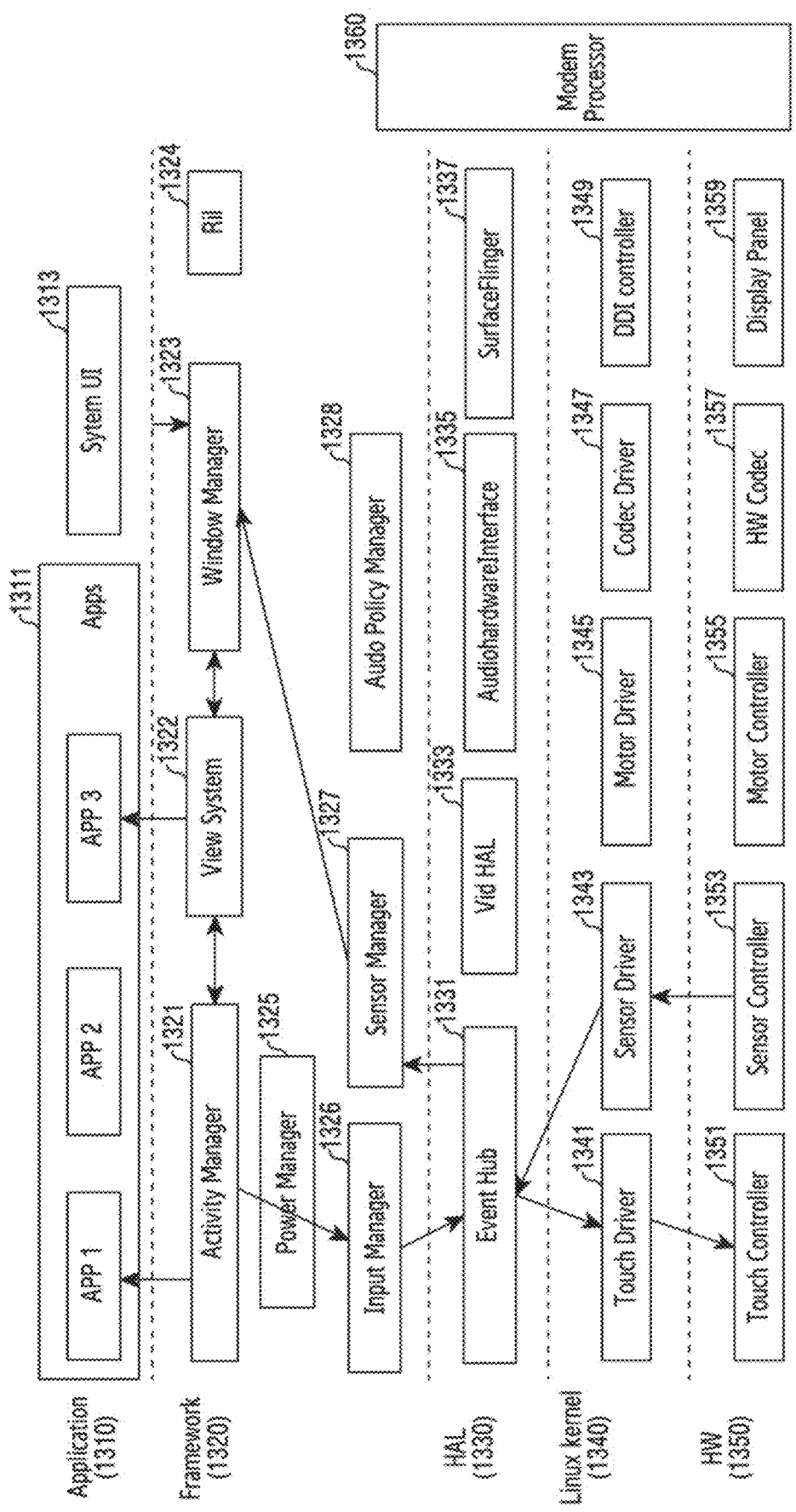
FIG. 13 is a diagram illustrating an example of signal processing for touch configuration control in a platform architecture of a flexible-type electronic device according to an embodiment.

FIG. 13 is a diagram illustrating an example of signal processing for touch configuration control in a platform architecture of a flexible-type electronic device (e.g., the electronic device 101 in FIG. 1) according to an embodiment.

Referring to FIG. 13, a platform capable of being applied to a flexible-type electronic device may have a structure in which a hardware (HW) layer 1350, a kernel (e.g., Linux kernel) layer 1340, a hardware abstraction layer (HAL) 1330, a framework layer 1320, and an application layer 1310 are stacked in sequence. The hardware (HW) layer 1350 may include, for example, a touch controller 1351, a sensor controller 1353, a motor controller 1355, and a hardware codec (HW codec) 1357, or a display panel 1359. The kernel layer 1340 may include, for example, a touch driver 1341, a sensor driver 1343, a motor driver 1345, a codec driver 1347, or a DDI controller 1349. The HAL 1330 may include, for example, an event hub 1331, a Vid HAL 1333, an audio hardware interface 1335, or a Surfaceflinger 1337. The framework layer 1320 may include, for example, an activity manager 1321, a view system 1322, a window manager 1323, and a radio interface layer (Ril) 1324, a power manager 1325, an input manager 1326, a sensor manager 1327, or an audio policy manager 1328. The application layer 1310 may include, for example, a plurality of apps APP1, APP2, and APP3 and a system user interface (user UI) 1313.

According to an embodiment, the sensor controller 1353 included in the hardware layer 1350 may provide a sensing value obtained from at least one sensor to the sensor driver 1343 included in the kernel layer 1340. The kernel layer 1340 may provide the sensing value to the event hub 1331 included in the HAL layer 1330. The event hub 1331 may transmit the sensing value to the framework layer 1320. The sensor manager 1327, the window manager 1323, and the view system 1322, which are included in the framework layer 1320, may interwork to enable at least one app (e.g., APP3) included in the application layer 1310 to perform an operation in response to the sensing value. The operation in response to the sensing value may be, for example, an operation of configuring an application screen according to the sensing value, which is input by the sensor driver 1343 and provided via the kernel layer 1340 and the framework layer 1320, and displaying the same on the display.

According to an embodiment, in order to control (area/sensitivity) a touch of the app depending on a detected area, the active manager 1321 included in the framework layer 1320 may transmit a control command for touch control to the input manager 1326. The input manager 1326 included in the framework layer 1320 may transmit the touch control command provided from the active manager 1321 to the touch driver 1341 included in the kernel layer 1340 through the event hub 1331 included in the HAL layer 1330. The touch driver 1341, in response to the transmitted touch command, may cause the touch controller 1351 included in the hardware layer 1350 to control the touch configuration suitable for the angle for sensing the touch, thereby preventing erroneous operation caused by the user touch.

Figure 14:
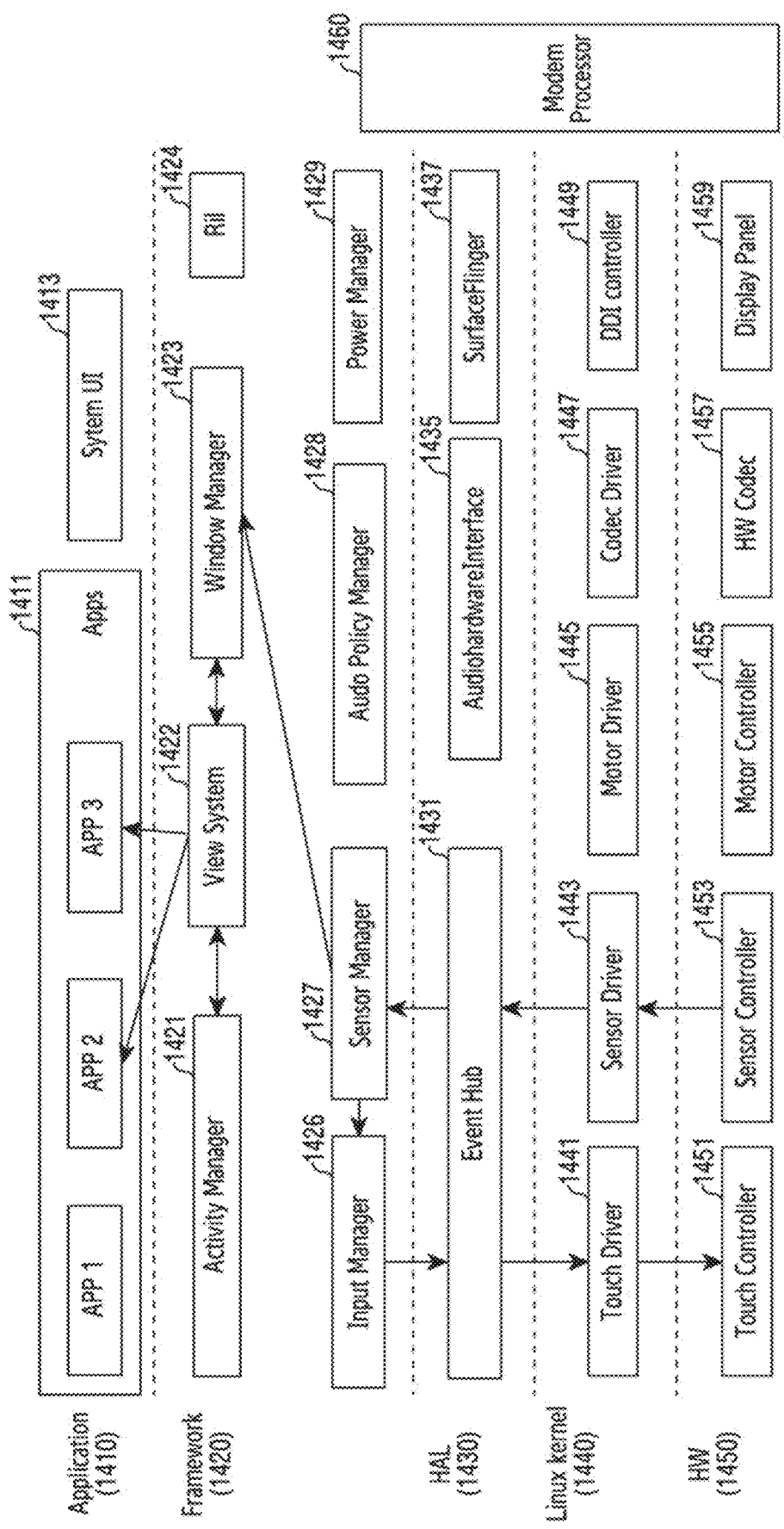
FIG. 14 is a diagram illustrating an example of signal processing for configuring touch sensitivity in a platform architecture of a flexible-type electronic device according to an embodiment.

FIG. 14 is a diagram illustrating an example of signal processing for configuring touch sensitivity in a platform architecture of a flexible-type electronic device (e.g., the electronic device 101 in FIG. 1) according to an embodiment.

Referring to FIG. 14, a platform capable of being applied to a flexible-type electronic device may have a structure in which a hardware (HW) layer 1450, a kernel layer 1440, a HAL 1430, a framework layer 1420, and an application layer 1410 are stacked in sequence. The hardware layer 1450 may include, for example, a touch controller 1451, a sensor controller 1453, a motor controller 1455, and a hardware codec 1457, or a display panel 1459. The kernel layer 1440 may include, for example, a touch driver 1441, a sensor driver 1443, a motor driver 1445, a codec driver 1447, or a DDI controller 1449. The HAL 1430 may include, for example, an event hub 1431, an audio hardware interface 1435, or a Surfaceflinger 1437. The framework layer 1420 may include, for example, an active manager 1421, a view system 1422, a window manager 1423, a Ril 1424, a power manager 1429, an input manager 1426, a sensor manager 1427, or an audio policy manager 1428. The application layer 1410 may include, for example, a plurality of apps APP1, APP2, and APP3 and a system user interface 1413.

According to an embodiment, the sensor controller 1453 included in the hardware layer 1450 may provide a sensing value related to a change in the screen size according to sliding or un-sliding of a sliding device, which is obtained from at least one sensor, to the sensor driver 1443 included in the kernel layer 1340. The kernel layer 1440 may provide the sensing value to the event hub 1431 included in the HAL layer 1430. The event hub 1431 may transmit the sensing value to the framework layer 1420. The sensor manager 1427, the window manager 1423, and the view system 1422, which are included in the framework layer 1420, may interwork to enable at least one app (e.g., APP2 or APP3) included in the application layer 1410 to perform an operation in response to the sensing value. The operation in response to the sensing value may be, for example, an operation of configuring an application screen according to the sensing value, which is input by the sensor driver 1443 and provided via the kernel layer 1440 and the framework layer 1320, and displaying the same on the display.

According to an embodiment, the sensor manager 1427 may notify the input manager 1426 included in the framework 1420 that the size of the sliding screen is being adjusted based on the sensing value. The sensor manager 1427 may recognize, for example, a change in the screen size according to a sliding-out operation or a sliding-in operation, based on the sensing value, and, in response thereto, provide a control command for lowering the touch sensitivity to the input manager 1426. In addition, the sensor manager 1427 may recognize that changing of the screen size according to the sliding-out operation or the sliding-in operation is completed based on, for example, the sensing value and, in response thereto, provide a control command for restoring the touch sensitivity to its original state to the input manager 1426. The input manager 1426 may transmit a control command for adjusting the touch sensitivity provided by the sensor manager 1427 to the touch driver 1441 included in the kernel layer 1440 through the event hub 1431 included in the HAL layer 1430. The touch driver 1441, in response to the transmitted touch command, may cause the touch controller 1451 included in the hardware layer 1450 to control touch configuration for adjustment to the touch sensitivity in the driving state or restoration to the touch sensitivity in the completion state, thereby preventing erroneous operations caused by the user touch.

Figure 15:
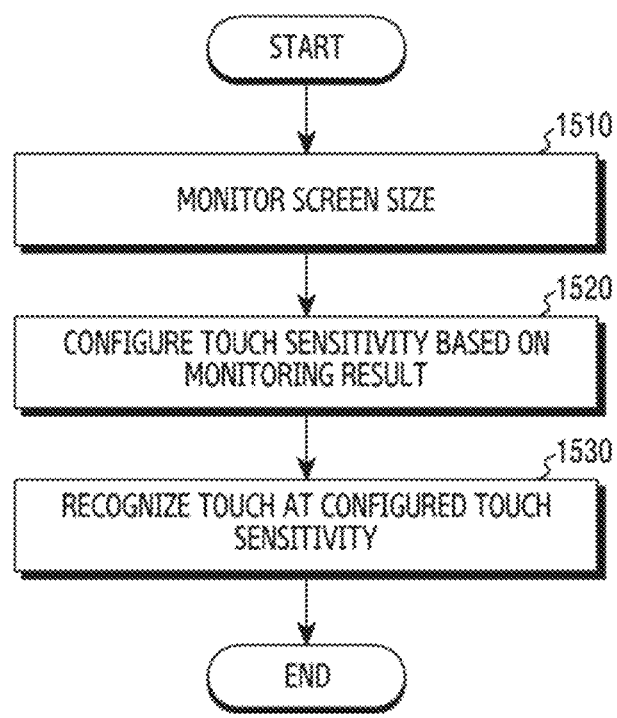
FIG. 15 is a diagram illustrating an example of a control flow performed to adjust touch sensitivity in response to a change in the screen size of a flexible-type electronic device according to an embodiment.

FIG. 15 is a diagram illustrating an example of a control flow performed to adjust touch sensitivity in response to a change in the screen size of a flexible-type electronic device (e.g., the electronic device 101 in FIG. 1) according to an embodiment.

Referring to FIG. 15, the electronic device may monitor a change in the screen size of the flexible display in step 1510. The screen size of the flexible display may be increased or reduced in response to a user's request. The screen size may be the size of a front window that is enabled to be used by the electronic device. For example, the electronic device may monitor a change in the size of a window disposed on the front surface capable of displaying application icons selectable by the user. The screen size of the display may be, for example, the size of a front window that is enabled to be used by the electronic device.

According to an embodiment, the electronic device may monitor a change in the screen size of the flexible display, based on a sensing result of at least one sensor. For example, in an electronic device equipped with a flexible display having a sliding structure including a sliding housing and a main housing, the screen size may be increased by a sliding-out operation and reduced by a sliding-in operation. The sliding-out operation is an operation in which the sliding housing moves in a direction away from the main housing, and the sliding-in operation is an operation in which the sliding housing moves in a direction to overlap the main housing. In this case, a change in the screen size according to the sliding-out operation and/or the sliding-in operation may be sensed through at least one sensor. The at least one sensor may output sensing results such as the number of rotations of a rolling axis, a moving distance, and a change in the screen size according to the sliding-out operation or the sliding-in operation.

The electronic device may configure or adjust touch sensitivity, based on the results of monitoring the change in the screen size in step 1520. If a change in the screen size is detected based on the monitoring results, the electronic device may dynamically control or adjust touch sensitivity quickly. The electronic device may adjust touch sensitivity if the changing of the screen size is finished or if a change in the screen size amounts to a configured value. The electronic device may restore the touch sensitivity to an initial touch sensitivity immediately after the changing of the screen size is finished or after a predetermined time elapses thereafter. The time period from when the screen size starts to change until when the changing of screen size is finished may be a driving section for defining a driving state. For example, the electronic device may recognize, as a driving section for defining the driving state, the period from a first time of detecting that the screen size starts to decrease or that the screen size starts to increase to a second time of detecting that the screen size is fixed. As another example, the electronic device may recognize, as a driving section for defining the driving state, the period from a first time of detecting that the screen size starts to decrease or that the screen size starts to increase to a second time after a predetermined time elapses after detecting that the screen size is fixed.

According to various embodiments, the electronic device may lower the touch sensitivity to a specific level or in stages during the driving section in which a change in the screen size is detected. The electronic device may linearly or non-linearly lower the touch sensitivity in the driving section. For example, the driving section may be a time period from when a sliding-out operation or sliding-in operation starts until when the sliding-out operation or sliding-in operation is finished. The touch sensitivity may be adjusted in the range of an initial touch sensitivity to a minimum touch sensitivity. For example, it may be adjusted to an initial touch sensitivity before the sliding-out operation or the sliding-in operation starts.

According to an embodiment, the electronic device may determine a second setting value by dynamically reducing a first setting value corresponding to an initial value during the driving section in which the screen size of the flexible display continues to change. The first setting value may be a value for configuring the touch sensitivity of the touch panel in an initial state in which a change in the screen size is not detected. The second setting value may be a value for configuring the touch sensitivity of the touch panel in a driving state in which a change in the screen size is being detected. For example, if a change in the screen size is detected, the electronic device may adjust the touch sensitivity according to the first setting value to a touch sensitivity according to the second setting value. The touch sensitivity according to the second setting value may be lower than the touch sensitivity according to the first setting value. That is, the touch panel in the driving state may respond more insensitively to the user touch, compared to the touch panel in the initial state.

According to an embodiment, if the changing of the screen size of the flexible display is finished, the electronic device may initialize the second setting value in the driving state to the first setting value. For example, if the changing of the screen size is completed, the electronic device may restore the touch sensitivity according to the second setting value to the touch sensitivity according to the first setting value. The touch sensitivity according to the first setting value may be higher than the touch sensitivity according to the second setting value. That is, the touch panel in the completion state may respond more sensitively to the user touch, compared to the touch panel in the driving state.

According to various embodiments, upon detecting an increase in the screen size, the electronic device may adjust the second setting value by further considering the amount of change in the area due to the increase in the screen size. For example, the electronic device may apply a 2-1st setting value to a primarily expanded touch area and apply a 2-2nd setting value to a secondarily expanded touch area depending on a change in the screen size. A touch sensitivity according to the 2-1st setting value may be higher than a touch sensitivity according to the 2-2nd setting value. This is due to the fact that the primarily expanded touch area may be expected to be more likely to be touched by the user than the secondarily expanded touch area. Accordingly, the primarily expanded touch area may respond more insensitively to the user touch, compared to the secondarily expanded touch area. Although it is assumed above that the screen size is expanded in two stages, it may be predicted that the description may also be applied to the case where the screen size is expanded in stages more than that.

In step 1530, the electronic device may apply the configured touch sensitivity to the touch panel and detect a user touch input through the touch panel. For example, the touch panel may respond more insensitively to a user touch in the driving state in which the screen size changes than in the initial state in which the screen size is fixed. In addition, the touch panel may respond more sensitively to a user touch in the completion state in which the changing of the screen size is completed than in the driving state in which the screen size changes.

Figure 16:
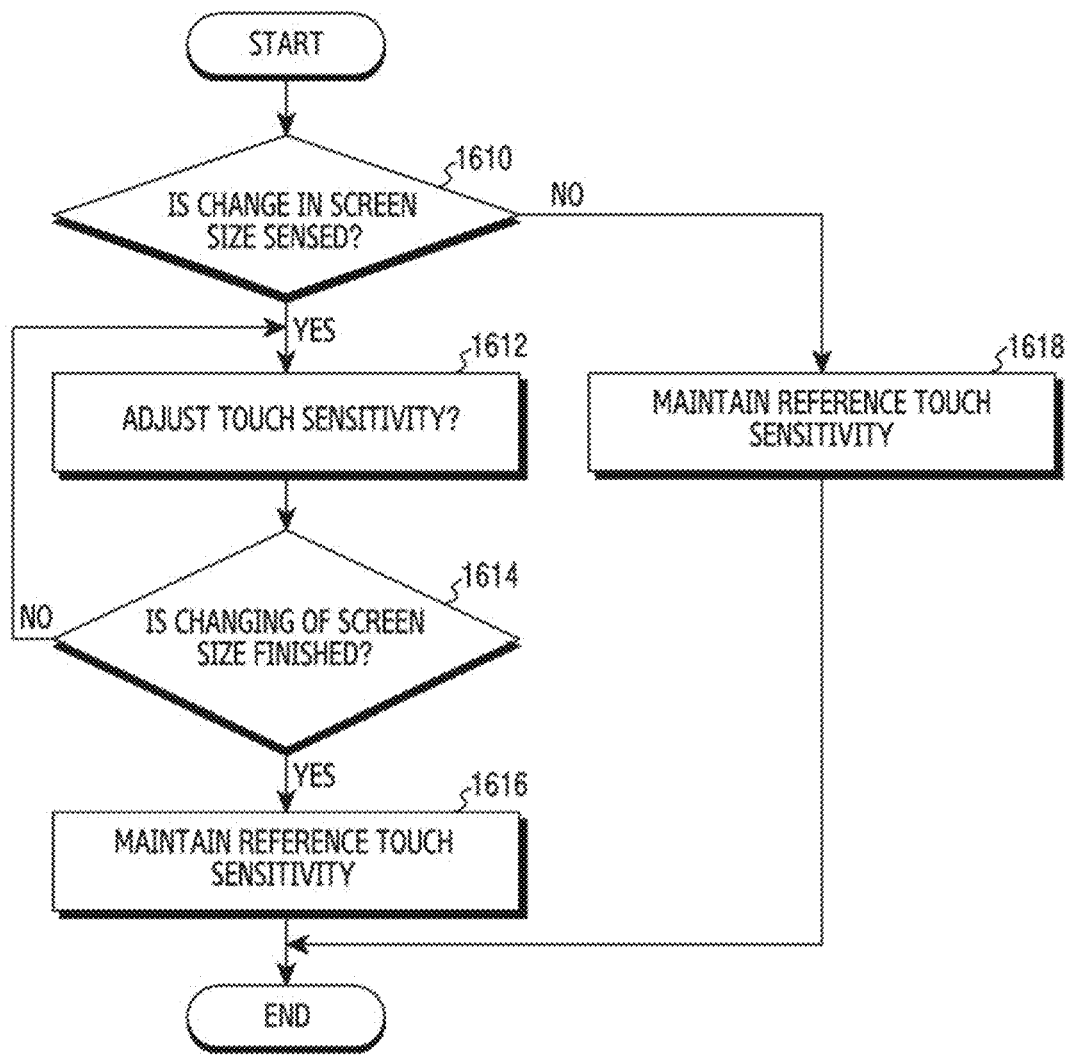
FIG. 16 is a diagram illustrating another example of a control flow performed to adjust touch sensitivity in response to a change in the screen size of a flexible-type electronic device according to an embodiment.

FIG. 16 is a diagram illustrating another example of a control flow performed to adjust touch sensitivity in response to a change in the screen size of a flexible-type electronic device (e.g., the electronic device 101 in FIG. 1) according to an embodiment.

Referring to FIG. 16, the electronic device may sense a change in the screen size of the flexible display in step 1610. The electronic device may sense a change in the screen size using sensing results obtained through at least one sensor. The screen size of the flexible display may be manually adjusted by a user or may be adjusted by driving of a motor in response to a user's request. The screen size may be the size of a front window that is enabled to be used by the electronic device. A touch panel may have the same size as the front window or may be small enough to be included in the front window. The touch panel may be integrated with the flexible display. In the electronic device, for example, the screen size may be increased by a sliding-out operation, and the screen size may be reduced by a sliding-in operation. If a change in the screen size is sensed, the electronic device may proceed to step 1612 to perform subsequent operations according to the change in the screen size, and if a change in the screen size is not sensed, the electronic device may proceed to step 1618 to perform subsequent operations according to the case where the screen size is fixed.

According to an embodiment, in step 1620, the electronic device may adjust touch sensitivity, based on a result of monitoring a change in the screen size. If a change in the screen size is sensed based on the monitoring result, the electronic device may dynamically control or adjust the touch sensitivity quickly. The electronic device may adjust the touch sensitivity, for example, if the changing of the screen size is finished or if a change in the screen size amounts to a configured value.

According to an embodiment, the electronic device may determine whether or not the changing of the screen size is finished in step 1614. The electronic device may make a determination, based on a sensing result obtained through at least one sensor. If it is determined that the changing of the screen size has not ended and continues to be made, the electronic device may return to step 1612 to adjust the touch sensitivity in consideration of a further changed screen size. If it is determined that the changing of the screen size is finished, the electronic device may proceed to step 1616.

According to an embodiment, the electronic device may recognize a driving state in a driving section by the time period from when the screen size starts to change to when the changing thereof is finished. For example, the electronic device may recognize, as a driving section, the period from a first time of detecting that the screen size starts to decrease or that the screen size starts to increase to a second time of detecting that the screen size is fixed. As another example, the electronic device may recognize, as a driving section, the period from a first time of detecting that the screen size starts to decrease or that the screen size starts to increase to a second time after a predetermined time elapses after detecting that the screen size is fixed.

According to an embodiment, the electronic device may restore the touch sensitivity to a reference touch sensitivity, which is an initial touch sensitivity, immediately after recognizing that the changing of the screen size is finished or after a predetermined time elapses thereafter in step 1616. A time period from when the screen size starts to change until when the changing of the screen size is finished may be a driving section for defining a driving state. For example, the electronic device may recognize, as a driving section for defining the driving state, the period from a first time of detecting that the screen size starts to decrease or that the screen size starts to increase to a second time of detecting that the screen size is fixed. As another example, the electronic device may recognize, as a driving section for defining the driving state, the period from a first time of detecting that the screen size starts to decrease or that the screen size starts to increase to a second time after a predetermined time elapses after detecting that the screen size is fixed.

According to an embodiment, the electronic device may maintain a reference touch sensitivity in step 1618. The reference touch sensitivity may be an initial touch sensitivity that may be configured by the electronic device in the initial state. If the current screen size is not the screen size according to the sliding-in state, the electronic device may maintain the touch sensitivity at a touch sensitivity corresponding to the current screen size, instead of the reference touch sensitivity, in step 1618.

Figure 17:
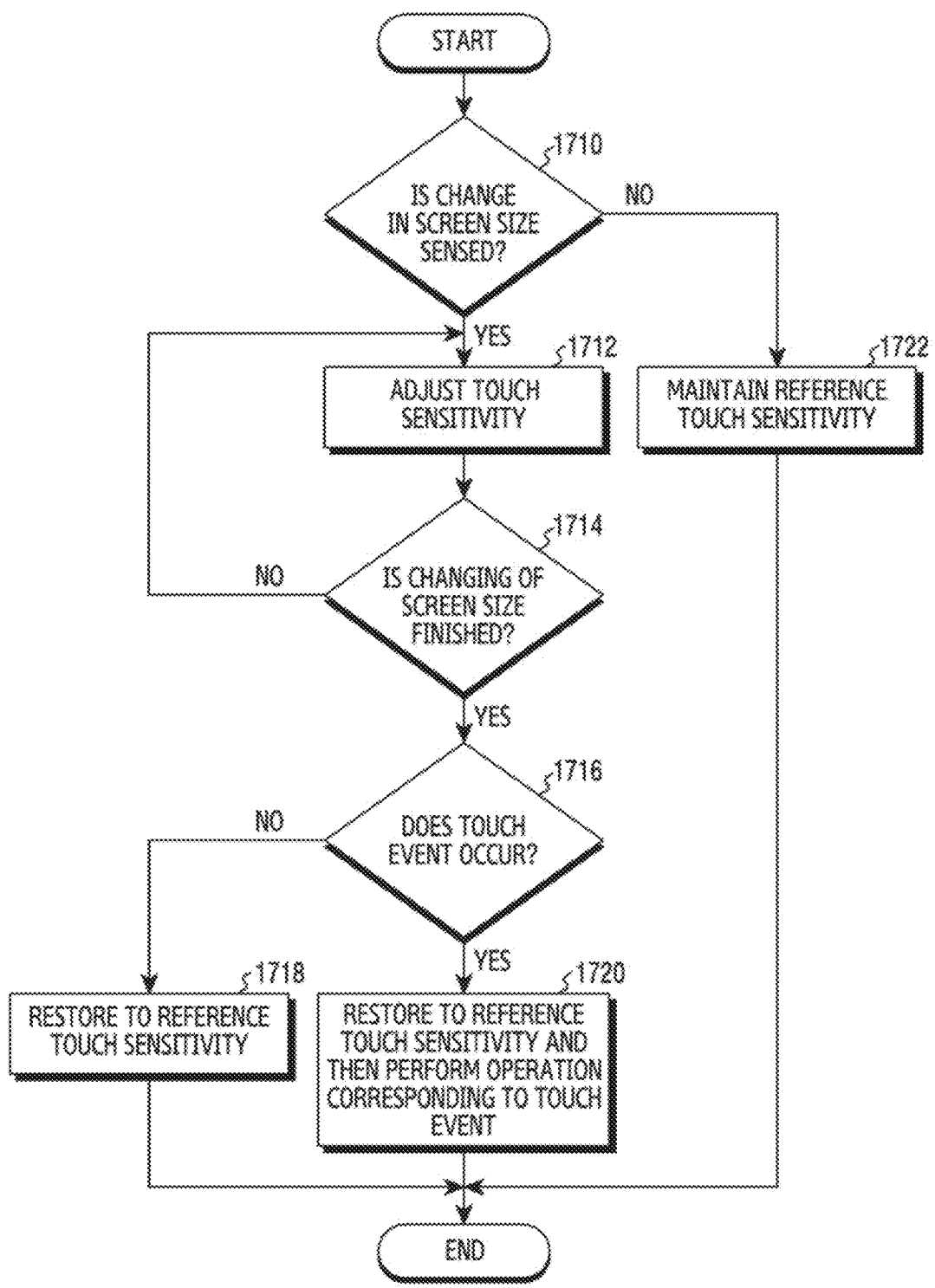
FIG. 17 is a diagram illustrating another example of a control flow performed to adjust touch sensitivity in response to a change in the screen size of a flexible-type electronic device according to an embodiment.

FIG. 17 is a diagram illustrating another example of a control flow performed to adjust touch sensitivity in response to a change in the screen size of a flexible-type electronic device (e.g., the electronic device 101 in FIG. 1) according to an embodiment.

Referring to FIG. 17, in step 1710, step 1712, and step 1714, the electronic device may perform an operation of dynamically reducing a first setting value corresponding to an initial value to configure a second setting value and adjusting touch sensitivity of a touch panel according to the configured second setting value during a driving section from when the screen size of the flexible display starts to change until when the changing of screen size is finished. Operations performed by the electronic device in step 1710, step 1712, and step 1714 may be the same as step 1610, step 1612, and step 1614 described with reference to FIG. 16. Accordingly, descriptions of specific operations performed by the electronic device in steps 1710, step 1712, and step 1714 are omitted.

According to an embodiment, if it is sensed that the changing of the screen size is finished, the electronic device may determine whether or not a touch event occurs in step 1716. The touch event may occur when a user touch satisfies predetermined conditions. For example, the touch event may occur by a user touch sensed after a sliding operation is completed. For example, if the electronic device lowers the touch sensitivity to a level capable of recognizing a touch even during a sliding operation, and if a user touch sensible even at the lowered touch sensitivity is held during the sliding operation, the electronic device may determine that a touch event has occurred. As another example, if the electronic device restores the lowered touch sensitivity to its original touch sensitivity as soon as the sliding operation is completed, and if a user touch is sensed at the restored touch sensitivity, the electronic device may determine that a touch event has occurred.

According to an embodiment, if no touch event occurs, the electronic device may restore the touch sensitivity to a touch sensitivity (e.g., a reference touch sensitivity) prior to the sliding operation and support a touch input at the restored touch sensitivity in step 1718.

According to an embodiment, if a touch event occurs, the electronic device may restore the touch sensitivity to a touch sensitivity (e.g., a reference touch sensitivity) prior to the sliding operation and perform an operation corresponding to the touch event in step 1720. For example, in response to a user touch causing the touch event, the electronic device may perform an operation after reflecting a situation in which the screen size is changed.

According to another embodiment, the electronic device may restore the touch sensitivity to a touch sensitivity before the sliding operation as soon as the sliding operation is completed and determine whether or not a touch event occurs at the time at which the sliding operation is completed. In this case, since the touch sensitivity has already been restored to the reference touch sensitivity, in step 1720, an operation of restoring the touch sensitivity may be omitted, and an operation corresponding to the touch event may be performed. In this case, the electronic device may implement a scenario of enlarging and displaying a photo on a screen when the sliding-out operation is completed through the sliding-out operation and the adjustment of touch sensitivity. For example, in an initial state in which at least two scenes are displayed on the screen due to execution of at least one application, the user may touch one of the two scenes and perform a sliding-out operation while holding the touch. The electronic device may adjust the touch sensitivity to a level capable of recognizing a touch in the driving state and restore the adjusted touch sensitivity to an original touch sensitivity immediately after the sliding-out operation is completed. Therefore, since the electronic device may recognize a user touch before the user touch is released, the electronic device may display the scene, which was displayed on the touch area, on the full screen with an increased size in response to a touch event according to the recognized touch.

Although the disclosure has been specifically shown and described with reference to specific embodiments, it will be understood by those skilled in the art that various changes may be made in forms and details without departing from the spirit and scope of the disclosure as defined by the appended claims and equivalents thereto.

According to an embodiment of the disclosure, an electronic device (e.g., the electronic device 101 in FIG. 1) may include a memory, a touch panel, a display having a flexible structure, at least one sensor configured to sense a change in the screen size of the display, and at least one processor electrically connected to the memory, the touch panel, the display, and the at least one sensor, wherein the memory may be configured to store instructions that cause, when executed, the at least one processor to dynamically reduce a first setting value corresponding to an initial value to determine a second setting value during a driving section in which a change in the screen size of the display is detected by a sensing result of the at least one sensor, adjust touch sensitivity of the touch panel by the determined second setting value, if changing of the screen size of the display is detected to be finished by a sensing result of the at least one sensor, initialize the second setting value to the first setting value, and adjust the touch sensitivity of the touch panel by the first setting value according to the initialization.

According to an embodiment of the disclosure, the memory may store instructions that cause, when executed, the processor to recognize, as the driving section, a period from a first time of detecting that the screen size of the display starts to decrease or that the screen size of the display starts to increase to a second time of detecting that the screen size of the display is fixed according to a sensing result of the at least one sensor.

According to an embodiment of the disclosure, the memory may store instructions that cause, when executed, the processor to recognize, as the driving section, a period from a first time of detecting that the screen size of the display starts to decrease or that the screen size of the display starts to increase to a second time after a predetermined time elapses after the screen size of the display is fixed according to a sensing result of the at least one sensor.

According to an embodiment of the disclosure, the touch sensitivity adjusted by the determined second setting value may be configured to be lower than the touch sensitivity adjusted by the first setting value according to the initialization.

According to an embodiment of the disclosure, the memory may store instructions that cause, when executed, the processor to divide a full screen that is dynamically expanded during the driving section into a plurality of areas and determine the second setting value to be different between the plurality of areas.

According to an embodiment of the disclosure, the memory may store instructions that cause, when executed, the processor to determine the second setting value to be lower for an area that is likely to be touched by a user of the electronic device when the screen size of the display changes, among the plurality of areas, than for an area that is not likely to be touched.

According to an embodiment of the disclosure, the memory may store instructions that cause, when executed, the processor to further consider, if the screen size of the display is detected to be increased, the amount of change in the area due to the increase in the screen size to determine the second setting value.

According to an embodiment of the disclosure, the screen size of the display may be a size of a front window that is enabled to be used by the electronic device.

According to an embodiment of the disclosure, the instructions may cause, when executed, the processor to perform, if a touch event is sensed during a time period from the time of adjusting the touch sensitivity of the touch panel by the determined second setting value until the time of detecting that the changing of the screen size of the display is finished, an operation according to a user experience scenario in response to the sensed touch event after the changing of the screen size of the display is finished.

According to an embodiment of the disclosure, the touch sensitivity adjusted by the determined second setting value may be either one of 4Phi corresponding to normal sensitivity or 3Phi corresponding to low sensitivity, and the touch sensitivity adjusted by the first setting value may be 5Phi corresponding to high sensitivity.

According to an embodiment of the disclosure, an operation method in a flexible-type electronic device (e.g., the electronic device 101 in FIG. 1) may include monitoring a change in the screen size of a flexible display, dynamically reducing a first setting value corresponding to an initial value to determine a second setting value during a driving section in which the screen size of the flexible display continues to change, adjusting touch sensitivity of a touch panel by the determined second setting value, if changing of the screen size of the flexible display is finished, initializing the second setting value to the first setting value, adjusting the touch sensitivity of the touch panel by the first setting value according to the initialization, and recognizing a touch on the touch panel using touch sensitivity adjusted by the first setting value or by the second setting value.

According to an embodiment of the disclosure, the method may further include recognizing, as the driving section, a period from a first time of detecting that the screen size of the display starts to decrease or that the screen size of the display starts to increase to a second time of detecting that the screen size of the display is fixed.

According to an embodiment of the disclosure, the method may further include recognizing, as the driving section, a period from a first time of detecting that the screen size of the display starts to decrease or that the screen size of the display starts to increase to a second time after a predetermined time elapses after the screen size of the display is fixed.

According to an embodiment of the disclosure, the touch sensitivity adjusted by the determined second setting value may be configured to be lower than the touch sensitivity adjusted by the first setting value according to the initialization.

According to an embodiment of the disclosure, the determining of the second setting value may include dividing a full screen that is dynamically expanded during the driving section into a plurality of areas and determining the second setting value to be different between the plurality of areas.

According to an embodiment of the disclosure, the second setting value may be determined to be lower for an area that is likely to be touched by a user of the electronic device when the screen size of the display changes, among the plurality of areas, than for an area that is not likely to be touched.

According to an embodiment of the disclosure, the determining of the second setting value may include further considering, if the screen size of the display is detected to be increased, the amount of change in the area due to the increase in the screen size to determine the second setting value.

According to an embodiment of the disclosure, the screen size of the display may be a size of a front window that is enabled to be used by the electronic device.

According to an embodiment of the disclosure, the method may further include performing, if a touch event is sensed during a time period from the time of adjusting the touch sensitivity of the touch panel by the determined second setting value until the time of detecting that the changing of the screen size of the display is finished, an operation according to a user experience scenario in response to the sensed touch event after the changing of the screen size of the display is finished.

According to an embodiment of the disclosure, the touch sensitivity adjusted by the determined second setting value may be either one of 4Phi corresponding to normal sensitivity or 3Phi corresponding to low sensitivity, and the touch sensitivity adjusted by the first setting value may be 5Phi corresponding to high sensitivity.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

The scope of protection is defined by the accompanying independent claims. Further features are specified by the accompanying dependent claims. Example implementations may be realized by including one or more features jointly and separately taken from any claim arbitrarily and in all permutations.

The examples described in the disclosure include non-limiting example implementations of components corresponding to one or more features specified by the appended independent claims, and these features (or components corresponding thereto) may, individually or in combination, contribute to improving one or more technical problems that may be inferred by those skilled in the art from the disclosure.

In addition, one or more components selected from any one example described in the disclosure may be combined with one or more components selected from one or more other examples described in the disclosure, or alternatively may be combined with the features of the appended independent claims to make further alternative examples.

Additional example implementations may be realized by including one or more components jointly and separately taken from any herein described implementation described in the disclosure arbitrarily and in all permutations. Other example implementations may also be realized by a combination of one or more features of the appended claims and one or more components selected from any example implementation set forth in the disclosure.

In making such additional example implementations, some components of any example implementation described in the disclosure may be omitted. One or more components that may be omitted are components that would be directly and obviously recognized by those skilled in the art as not being so essential to the functioning of the technology in light of the technical problem discernible from the disclosure. Those skilled in the art would recognize that even if these omitted components are replaced or removed, other components or features of the further alternative example do not need to be modified to compensate for such a change. Thus, further example implementations may be included in the disclosure according to this technology even if a selected combination of the features and/or components is not specifically recited.

Two or more physically separate components of any described example implementation set forth in the disclosure may alternatively be integrated into a single component, where such integration is possible, and such integration would be possible as long as the single integrated component performs the same function. On the other hand, a single component in any example implementation described in the disclosure may alternatively be implemented as two or more separate components that perform the same function, where appropriate.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

What is claimed is:

1. An electronic device comprising:
   memory configured to store instructions;
   a flexible display having a viewable screen size which is changeable;
   a touch panel included in the flexible display;
   at least one sensor configured to sense a change in the screen size of the flexible display; and
   at least one processor electrically connected to the memory, the touch panel, the flexible display, and the at least one sensor,
   wherein the instructions, when executed by the at least one processor, cause the electronic device to:
     based on determining that the screen size of the flexible display is changing according to a sensing result of the at least one sensor, adjust a touch sensitivity of the touch panel, while the screen size is changing, from a first setting value to a second setting value; and
     based on determining that the changing of the screen size of the flexible display is finished by according to a sensing result of the at least one sensor, adjust the touch sensitivity of the touch panel from the second setting value to the first setting value.

2. The electronic device of claim 1, wherein the instructions, when executed by the at least one processor, further cause the electronic device is to recognize a period from a first time, at which the at least one sensor detects that the screen size of the flexible display starts to change, to a second time at which the at least one sensor detects that the screen size of the flexible display is fixed.

3. The electronic device of claim 2, wherein the touch sensitivity of the touch panel is lower when adjusted to the second setting value than when adjusted to the first setting value.

4. The electronic device of claim 3, wherein the instructions, when executed by the at least one processor, cause the electronic device to, during the period:
divide the flexible display into a plurality of areas; and
adjust the touch sensitivity of the touch panel differently in a first area of the plurality of areas than in a second area of the plurality of areas.

5. The electronic device of claim 4, wherein the instructions, when executed by the at least one processor, cause the electronic device to adjust the touch sensitivity to be lower in the first area based on determining that, during the period, the first area is to be touched more than the second area.

6. The electronic device of claim 3, wherein the instructions, when executed by the at least one processor, cause the electronic device to:
determine that the changing of the screen size increases the screen size; and
set the second setting value based on an amount of increase in the screen size.

7. The electronic device of claim 1, wherein the screen size of the flexible display is a size of a front window of the electronic device.

8. The electronic device of claim 1, wherein the instructions, when executed by the at least one processor, cause the electronic device to:
detect a touch operation to the touch panel during the changing of the screen size of the flexible display; and
perform, after the changing of the screen size of the flexible display is finished, an operation according to the touch operation.

9. The electronic device of claim 1, wherein, based on a setting of the touch panel, the second setting value indicates either a first sensitivity value or a second sensitivity value that is lower than the first sensitivity value, and
the first setting value indicates a third sensitivity value that is both higher than the first sensitivity value and is also higher than the second sensitivity value.

10. The electronic device of claim 1, further comprising:
a first housing; and
a second housing that is slidable with respect to the first housing,
wherein the flexible display is accommodated in the first housing and the second housing, and
wherein the viewable screen size is an exposed area of the flexible display that is exposed to an outside and is changed according to the second housing being moved with respect to the first housing.

* * * * *